United States Patent
Fukushima et al.

(10) Patent No.: US 10,569,589 B2
(45) Date of Patent: Feb. 25, 2020

(54) THREE-DIMENSIONAL PRINTER, PRINT DATA CREATION DEVICE, METHOD OF CREATING PRINT DATA, AND COMPUTER-READABLE STORAGE MEDIUM

(71) Applicant: CASIO COMPUTER CO., LTD., Tokyo (JP)

(72) Inventors: Takayuki Fukushima, Tokyo (JP); Satoshi Kurosawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 218 days.

(21) Appl. No.: 15/710,324

(22) Filed: Sep. 20, 2017

(65) Prior Publication Data
US 2018/0170086 A1 Jun. 21, 2018

(30) Foreign Application Priority Data
Dec. 20, 2016 (JP) ................................ 2016-246178

(51) Int. Cl.
| | | |
|---|---|---|
| B41M 7/00 | (2006.01) | |
| B41J 2/205 | (2006.01) | |
| B41J 11/00 | (2006.01) | |
| B29C 64/268 | (2017.01) | |
| B29C 64/393 | (2017.01) | |

(Continued)

(52) U.S. Cl.
CPC ........... *B41M 7/009* (2013.01); *B29C 64/268* (2017.08); *B29C 64/393* (2017.08); *B41J 2/205* (2013.01); *B41J 11/002* (2013.01); *B29C 64/20* (2017.08); *B29C 64/205* (2017.08); *B29C 64/386* (2017.08); *B33Y 30/00* (2014.12); *B41M 3/00* (2013.01); *B41M 5/0005* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,728,422 B1 * | 4/2004 | Weiss | ...................... | G06T 17/00 345/419 |
| 2013/0161874 A1 * | 6/2013 | Horiuchi | ............... | B29C 44/022 264/415 |

(Continued)

FOREIGN PATENT DOCUMENTS

| | | |
|---|---|---|
| JP | S64-28660 A | 1/1989 |
| JP | 2000-57380 A | 2/2000 |

(Continued)

*Primary Examiner* — Rocio Del Mar Perez-Velez
*Assistant Examiner* — Hung H Dang
(74) *Attorney, Agent, or Firm* — Chen Yoshimura LLP

(57) ABSTRACT

A print data creation device creates, from two-dimensional image data, three-dimensional print data to be printed on a thermally distensible sheet. The device includes a processor programmed to receive the two-dimensional image data of prescribed gradations; divide the two-dimensional image data of prescribed gradations into a plurality of density layers that expand to different respective expansion heights when printed on the thermally distensible sheet; create, from the plurality of density layers, an expansion data set having a plurality of layer images to be printed on the thermally distensible sheet; and causes the expansion data set to be output to a printing unit that prints on the thermally distensible sheet.

15 Claims, 16 Drawing Sheets

(51) Int. Cl.
  *B29C 64/20* (2017.01)
  *B33Y 30/00* (2015.01)
  *B29C 64/386* (2017.01)
  *B29C 64/205* (2017.01)
  *B41M 3/00* (2006.01)
  *B41M 5/00* (2006.01)

(56) References Cited

U.S. PATENT DOCUMENTS

2013/0202220 A1\* 8/2013 Takeshita ............... G06T 5/001
  382/264
2017/0132836 A1\* 5/2017 Iverson ................. G06T 15/04

FOREIGN PATENT DOCUMENTS

| JP | 2001-150812 A | 6/2001 |
| JP | 2008-90750 A | 4/2008 |

\* cited by examiner

THREE-DIMENSIONAL PRINTER, PRINT DATA CREATION DEVICE, METHOD OF CREATING PRINT DATA, AND COMPUTER-READABLE STORAGE MEDIUM

BACKGROUND OF THE INVENTION

1. Field of the Invention

The present invention relates to a three-dimensional printer, a print data creation device, a method of creating print data, and a computer-readable storage medium.

2. Description of the Related Art

One conventional method of forming three-dimensional images involves using a black ink material that converts electromagnetic waves to heat (an electromagnetic wave heat conversion material) to print a desired image on a medium including an expansion layer (foaming layer) on one surface that expands in accordance with the amount of heat absorbed (a thermally distensible sheet (thermal foaming sheet), for example), and then irradiating the portion of the expansion layer where the image is formed on the medium with electromagnetic waves to make the portion expand and rise up (see Japanese Patent Application Laid-Open Publication No. S64-28660 and Japanese Patent Application Laid-Open Publication No. 2001-150812, for example). Below, a device for forming this type of three-dimensional image will be referred to as a 2.5D printer.

SUMMARY OF THE INVENTION

In recent years, there have been plans for this type of three-dimensional image formation printer to be used to form surface materials for various products. Conventional content to be formed on thermally expandable sheets has been provided by manufacturers.

Therefore, although it is likely that manufacturers will similarly provide content for surface materials, it is even more desirable that users be able to create their own three-dimensional images for surface materials.

More specifically, it is preferable that users be able to create content for forming protrusions and recesses from easily creatable 2D image data.

Therefore, the present invention aims to make it possible for users to easily create three-dimensional images in which protrusions and recesses are formed. Accordingly, the present invention is directed to a scheme that substantially obviates one or more of the problems due to limitations and disadvantages of the related art.

SUMMARY OF THE INVENTION

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a three-dimensional printer that creates, from two-dimensional image data, three-dimensional print data; prints the three-dimensional print data on a thermally distensible sheet; and expands the thermally distensible sheet in accordance with the created three-dimensional print data, the printer including: a processor programmed to perform the following functions: receiving the two-dimensional image data of prescribed gradations; dividing the image data of prescribed gradations into a number of layers less than a number of gradation levels in the image data on the basis of a gradation value at each pixel point so as to obtain a plurality of layer images of corresponding expansion heights that differ from each other as a first expansion data set, the first expansion data set being for causing an expansion layer included in a thermally distensible sheet to expand from one surface of the thermally distensible sheet; receiving a command from a user specifying one of the plurality of layer images; and moving and reassigning at least one region in the layer image specified by the user to a layer image belonging to a second expansion data set, the second expansion data set containing a single layer image or a plurality of layer images and being for causing the expansion layer to expand from another surface of the thermally distensible sheet that is opposite to the surface; a printing unit that prints the first expansion data set and the second expansion data set on the thermally distensible sheet; and an expansion device that irradiates the thermally distensible sheet having the first expansion data set and the second expansion data set printed thereon with electromagnetic waves to form protrusions and recesses on the surfaces of the thermally distensible sheet.

In another aspect, the present disclosure provides a print data creation device that creates, from two-dimensional image data, three-dimensional print data to be printed on a thermally distensible sheet so as to expand the thermally distensible sheet in accordance with the created three-dimensional print data, the device including: a processor programmed to perform the following functions: receiving the two-dimensional image data of prescribed gradations; dividing the two-dimensional image data of prescribed gradations into a plurality of density layers that expand to different respective expansion heights when printed on the thermally distensible sheet; creating, from the plurality of density layers, an expansion data set having a plurality of layer images to be printed on the thermally distensible sheet; and causing the expansion data set to be output to a printing unit that prints on the thermally distensible sheet.

In another aspect, the present disclosure provides a method of creating, from two-dimensional image data, three-dimensional print data to be printed on a thermally distensible sheet, the method including: receiving the two-dimensional image data of prescribed gradations; dividing the image data of prescribed gradations into a number of layers less than a number of gradation levels in the image data on the basis of a gradation value at each pixel point so as to obtain a plurality of layer images of corresponding expansion heights that differ from each other as a first expansion data set, the first expansion data set being for causing an expansion layer included in a thermally distensible sheet to expand from one surface of the thermally distensible sheet; receiving a command from a user specifying one of the plurality of layer images; and moving and reassigning at least one region in the layer image specified by the user to a layer image belonging to a second expansion data set, the second expansion data set containing a single layer image or a plurality of layer images and being for causing the expansion layer to expand from another surface of the thermally distensible sheet that is opposite to the surface.

In another aspect, the present disclosure provides a non-transitory computer-readable storage medium having stored therein a computer-executable program for causing a print data creation device to perform the following: receiving two-dimensional image data of prescribed gradations; dividing the image data of prescribed gradations into a number of layers less than a number of gradations levels in the image data on the basis of a gradation value at each pixel point so as to obtain a plurality of layer images of corresponding expansion heights that differ from each other as a first expansion data set, the first expansion data set being for causing an expansion layer included in a thermally distensible sheet to expand from one surface of the thermally distensible sheet; and receiving a command from a user specifying one of the plurality of layer images; and moving and reassigning at least one region in the layer image specified by the user to a layer image belonging to a second expansion data set, the second expansion data set containing a single layer image or a plurality of layer images and being for causing the expansion layer to expand from another surface of the thermally distensible sheet that is opposite to the surface.

It is to be understood that both the foregoing general description and the following detailed description are exemplary and explanatory, and are intended to provide further explanation of the invention as claimed.

BRIEF DESCRIPTION OF DRAWINGS

FIG. 5I is an example of the surfacer screen on which a high bulge layer of the front expansion layer set is displayed.

DETAILED DESCRIPTION OF EMBODIMENTS

Next, an embodiment of the present invention will be described in detail with reference to figures.

The present embodiment relates to a method of forming three-dimensional images by printing a desired image with a black ink containing a material that converts electromagnetic waves into heat (an electromagnetic wave heat conversion material such as carbon, for example) on a medium having an expansion layer (foaming layer) on one surface that expands in accordance with the amount of heat absorbed (a thermally distensible sheet (thermal foaming sheet), for example), and then irradiating the portion of the expansion layer where the image is formed on the medium with electromagnetic waves to make that portion expand and rise up.

Figure 1:
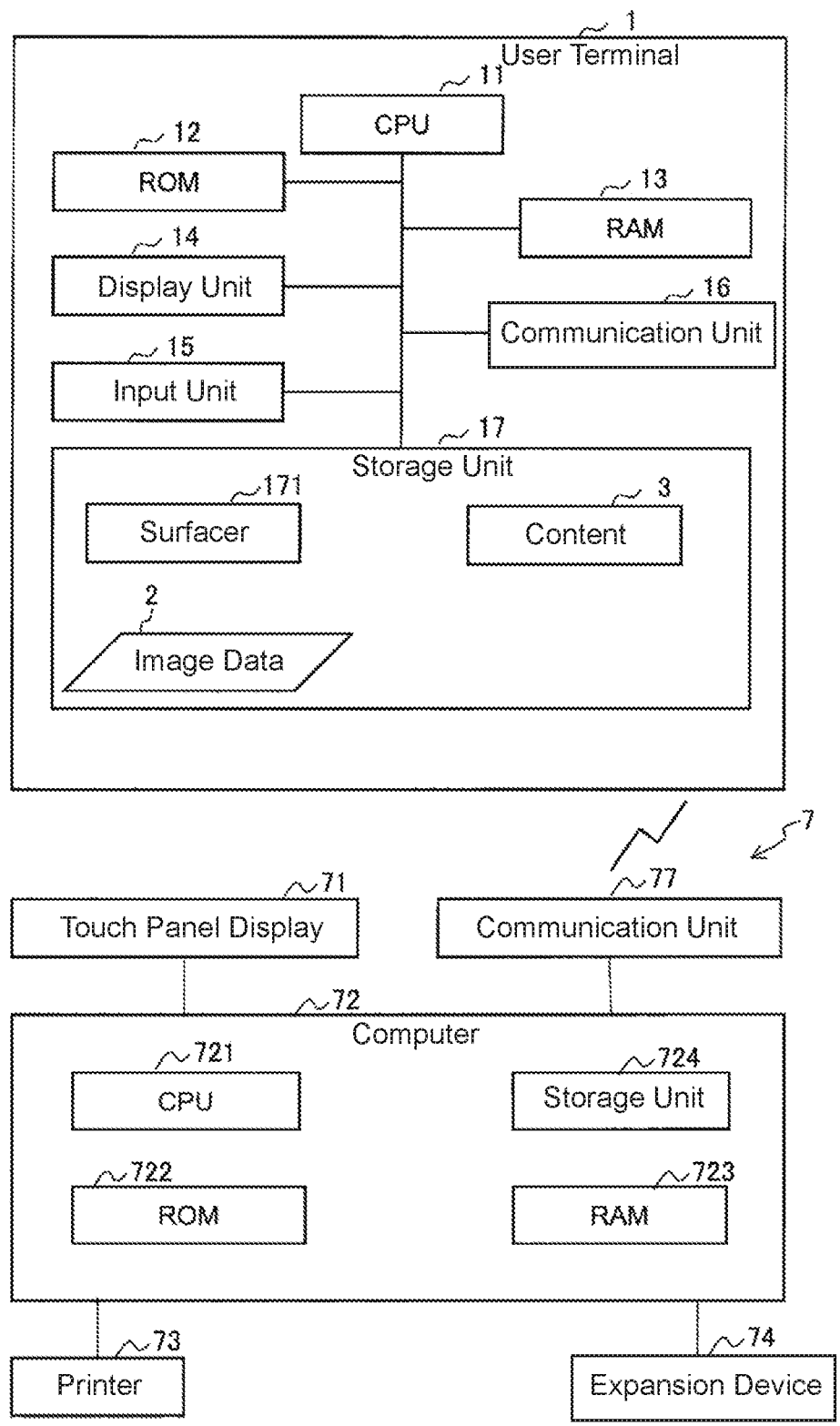
FIG. 1 is a configuration diagram schematically illustrating a three-dimensional printer according to an embodiment.

FIG. 1 is a configuration diagram schematically illustrating a user terminal 1 and a 2.5D printer 7 according to the present embodiment.

The user terminal 1 includes a central processing unit (CPU) 11, a read-only memory (ROM) 12, a random-access memory (RAM) 13, a display unit 14, an input unit 15, a communication unit 16, and a storage unit 17. The storage unit 17 stores software programs such as a surfacer 171 as well as image data 2 and content 3. The CPU 11 includes a computing device such as a processor.

The display unit 14 is a liquid crystal display panel or the like, for example. The input unit 15 includes a mouse, touch panel, keyboard or the like and is used to operate the user terminal 1. Furthermore, the user terminal 1 is connected with the 2.5D printer 7 via the communication unit 16 to enable bidirectional communication therebetween. The communication unit 16 is a Wi-Fi (registered trademark) wireless communication module, for example.

The surfacer 171 is for extracting and creating the content 3 for forming protrusion/recess patterns from the original 2D image data 2 and is support software for configuring which areas should protrude and by how much. The surfacer 171 thus functions as a 2.5D content generator and is a software program that makes it possible to easily create 2.5D content from 2D image data. The surfacer 171 of the present embodiment is a plug-in for use in image software but is not limited to this example and may take the form of a standalone software application or any other format.

The 2.5D printer 7 includes a touch panel display 71, a printer 73, an expansion device (foaming device) 74, and a communication unit 77 that are connected to a computer 72. The 2.5D printer 7 prints carbon black to form a grayscale image on a thermally distensible sheet (described below) and then irradiates the thermally distensible sheet with near-infrared light or visible light to make the regions of the thermally distensible sheet where the carbon black is printed expand and thereby form a three-dimensional image. In the present embodiment, the thermally distensible sheet is a concept that includes both paper and other mediums. Moreover, the 2.5D printer 7 is sometimes abbreviated as "2.5D printer."

The computer 72 includes a CPU 721, a ROM 722, a RAM 723, and a storage unit 724 and controls the printer 73 and the expansion device 74. The storage unit 724 stores content for forming three-dimensional images on thermally distensible sheets.

The touch panel display 71 is formed by bonding together a touch panel and a liquid crystal display panel and is used to operate the 2.5D printer 7. Together, the computer 72 and the touch panel display 71 function as a display unit that displays operating procedure instructions for the printer 73 and the expansion device 74. Furthermore, the computer 72 is connected with the user terminal 1 via the communication unit 77 to enable bidirectional communication therebetween. The communication unit 77 is a Wi-Fi (registered trademark) wireless communication module, for example.

The printer 73 is an inkjet printer and prints grayscale images in carbon black ink (a prescribed printing material) on the front surface and/or the rear surface of the thermally distensible sheet, which is the medium. Note that the printer 73 is not limited to being an inkjet printer and may be a laser printer, and the prescribed printing material may be a combination of a toner and a developer.

The expansion device 74 irradiates the thermally distensible sheet with light (electromagnetic waves) in the visible spectrum or the near-infrared spectrum while conveying the thermally distensible sheet and thereby heats the portions where the carbon black grayscale image (electromagnetic wave heat conversion image) is formed. The expansion device 74 includes a halogen heater and a conveyor (not illustrated in the figure), for example, and irradiates one surface of the thermally distensible sheet with light energy.

During a procedure for inserting the medium into the printer 73, the touch panel display 71 displays a guide screen showing how to insert the medium into the printer 73. This guide screen displays instructions in the form of an image corresponding to the medium and an image corresponding to the 2.5D printer 7.

During a procedure for inserting the medium into the expansion device 74, the touch panel display 71 displays a guide screen showing how to insert the medium into the expansion device 74. This guide screen displays instructions in which the positional relationship between the image corresponding to the medium and the image corresponding to the 2.5D printer 7 is reversed relative to in the guide screen showing how to insert the medium into the printer 73.

Figure 2:
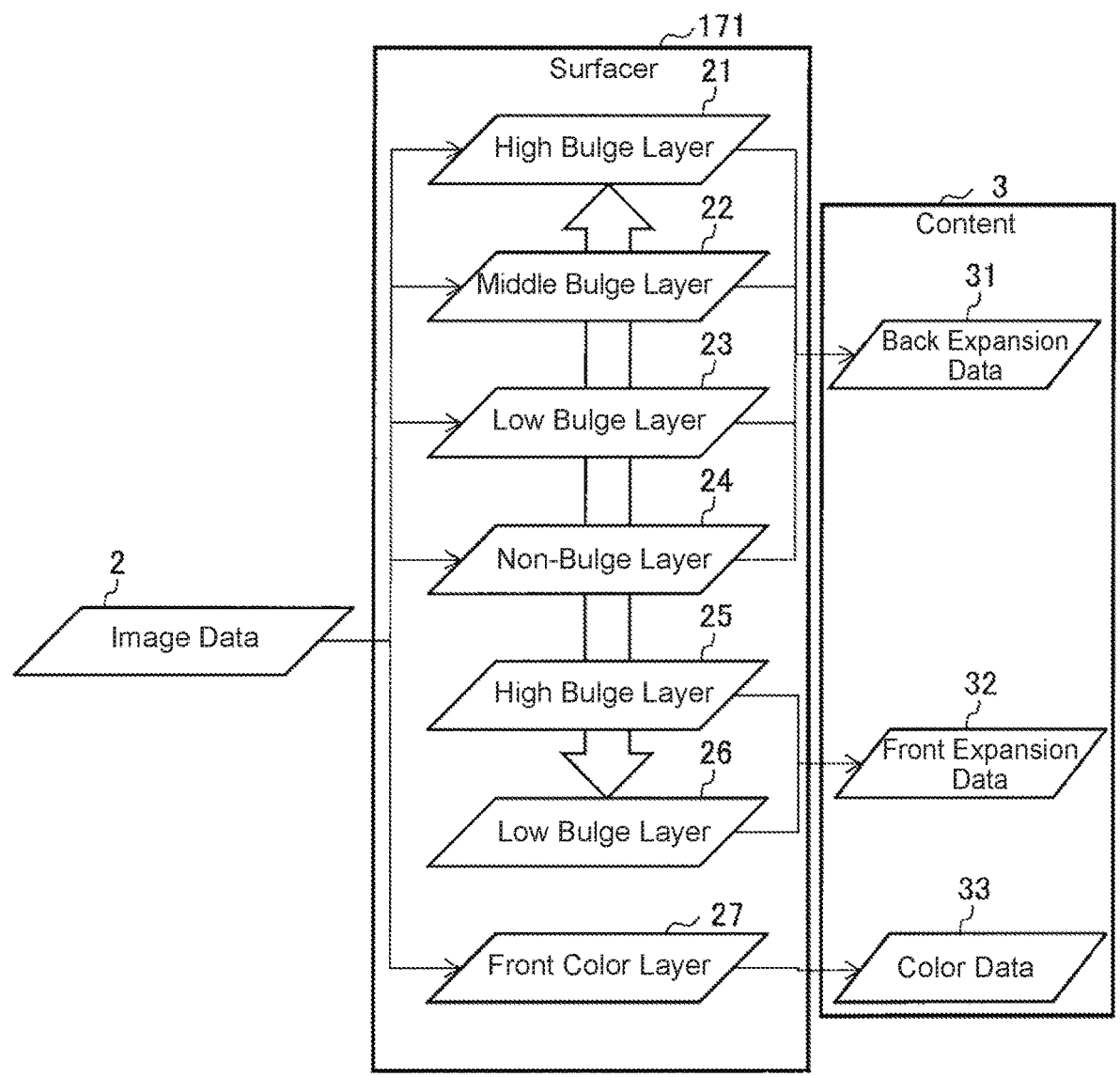
FIG. 2 illustrates input data, internal data, and output data in a surfacer.

FIG. 2 illustrates input data, internal data, and output data in the surfacer 171.

The input data for the surfacer 171 is the image data 2, and the output data is the content 3, which includes back expansion data 31, front expansion data 32, and color data 33. The image data 2 may be in any format, such as CMY JPEG or RGB BMP.

The CPU 11 executes the surfacer 171 to allocate the input image data 2 to a front color layer 27 and a back expansion layer set that includes a high bulge layer 21, a middle bulge layer 22, a low bulge layer 23, and a non-bulge layer 24. This back expansion layer set is first expansion data for expanding the expansion layer from the rear surface of the thermally distensible sheet.

When the CPU 11 executes the surfacer 171, the image data 2 is allocated to each layer of the back expansion layer set on the basis of the gradation values (brightness) of the image data 2. The CPU 11 allocates regions with a brightness of greater than 75% to the high bulge layer 21 and sets a density for these regions to 100% (black). Regions of the high bulge layer 21 to which none of the image data 2 is allocated are left transparent.

The CPU 11 allocates regions with a brightness of greater than 50% and less than or equal to 75% to the middle bulge layer 22 and sets the density for these regions to 66% (dark gray). Regions of the middle bulge layer 22 to which none of the image data 2 is allocated are left transparent.

The CPU 11 allocates regions with a brightness of greater than 25% and less than or equal to 50% to the low bulge layer 23 and sets the density for these regions to 33% (light gray). Regions of the low bulge layer 23 to which none of the image data 2 is allocated are left transparent.

The CPU 11 allocates regions with a brightness of less than or equal to 25% to the non-bulge layer 24 and sets the density for these regions to 0% (white). Regions of the non-bulge layer 24 to which none of the image data 2 is allocated are left transparent.

The regions in the high bulge layer 21, the regions in the middle bulge layer 22, the regions in the low bulge layer 23, and the regions in the non-bulge layer 24 are printed on the rear surface of the thermally distensible sheet at these different respective densities and therefore expand to different respective expansion heights when irradiated with light.

Thus, the CPU 11 allocates the image data 2 that includes prescribed gradation levels to any of four layers in accordance with the gradation value (brightness) at each coordinate and also sets a density corresponding to the allocated layer. This makes it possible to preview the expansion data simply by combining and displaying the layers.

Furthermore, when the CPU 11 executes the surfacer 171, a high bulge layer 25 and a low bulge layer 26 for a front expansion layer set are prepared, and at least one of the regions from the high bulge layer 21, the middle bulge layer 22, the low bulge layer 23, and the non-bulge layer 24 in the back expansion layer set can be moved back and forth therebetween. This front expansion layer set is second expansion data for expanding the expansion layer from the front surface of the thermally distensible sheet. The regions in the high bulge layer 25 and the regions in the low bulge layer 26 are printed on the front surface of the thermally distensible sheet at different respective densities and therefore expand to different respective expansion heights when irradiated with light.

Upon receiving an output command, the CPU 11 combines the high bulge layer 21, the middle bulge layer 22, the low bulge layer 23, and the non-bulge layer 24 to create the back expansion data 31, which is mirror-reversed. The CPU 11 also combines the high bulge layer 25 and the low bulge layer 26 to create the front expansion data 32 and creates the color data 33 from the front color layer 27.

The high bulge layer 21, the middle bulge layer 22, the low bulge layer 23, and the non-bulge layer 24 are mirror-reversed in the back expansion data 31. This makes it easy to understand how the high bulge layer 21, the middle bulge layer 22, the low bulge layer 23, and the non-bulge layer 24 will correspond to regions on the front of the thermally distensible sheet. This also makes it possible to easily display the high bulge layer 21, the middle bulge layer 22, the low bulge layer 23, and the non-bulge layer 24 overlapping with the high bulge layer 25, the low bulge layer 26, and the front color layer 27 that are printed on the front of the thermally distensible sheet.

Figure 3:
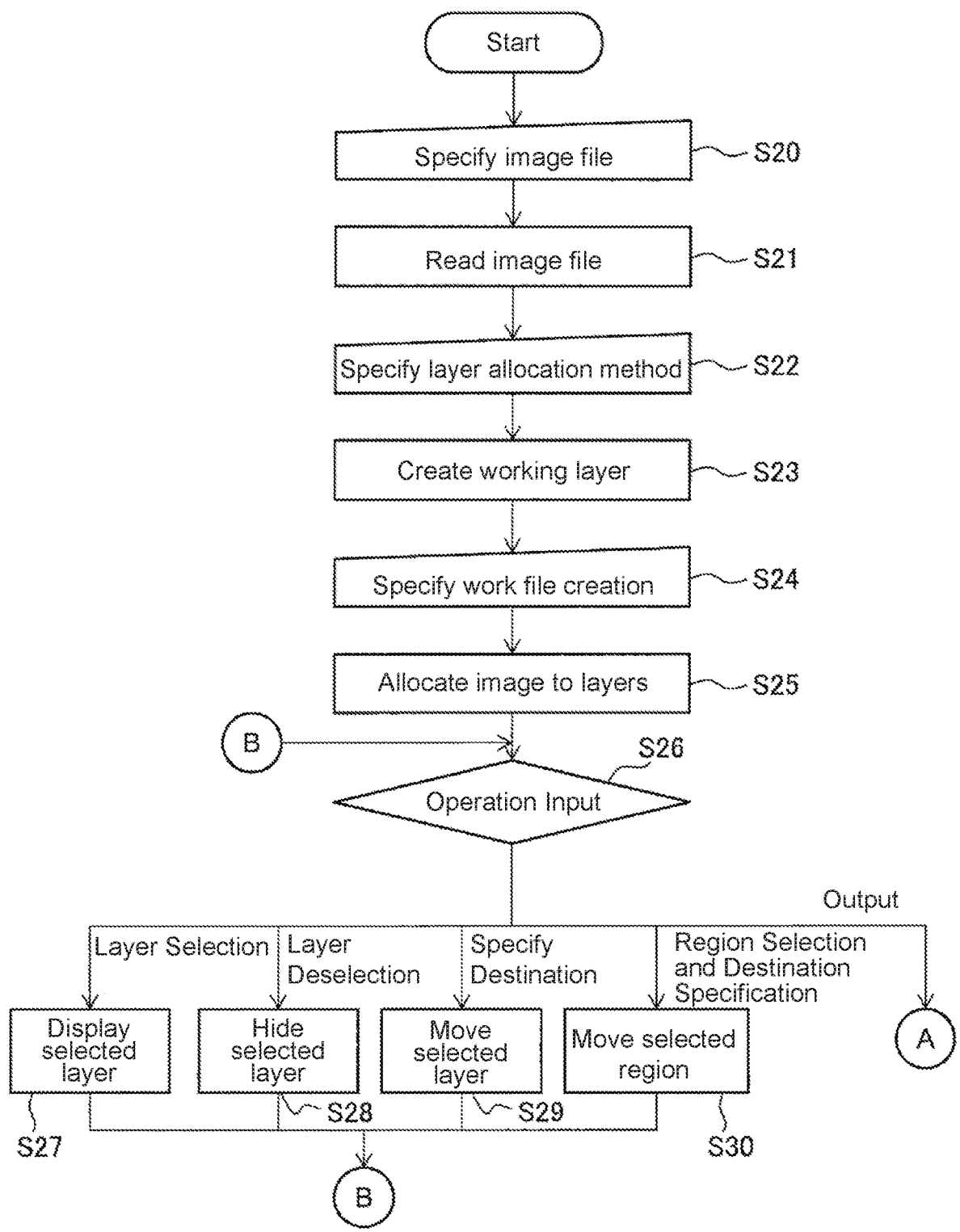
FIG. 3 is a flowchart illustrating a print data creation process for the surfacer (first example).
Figure 4:
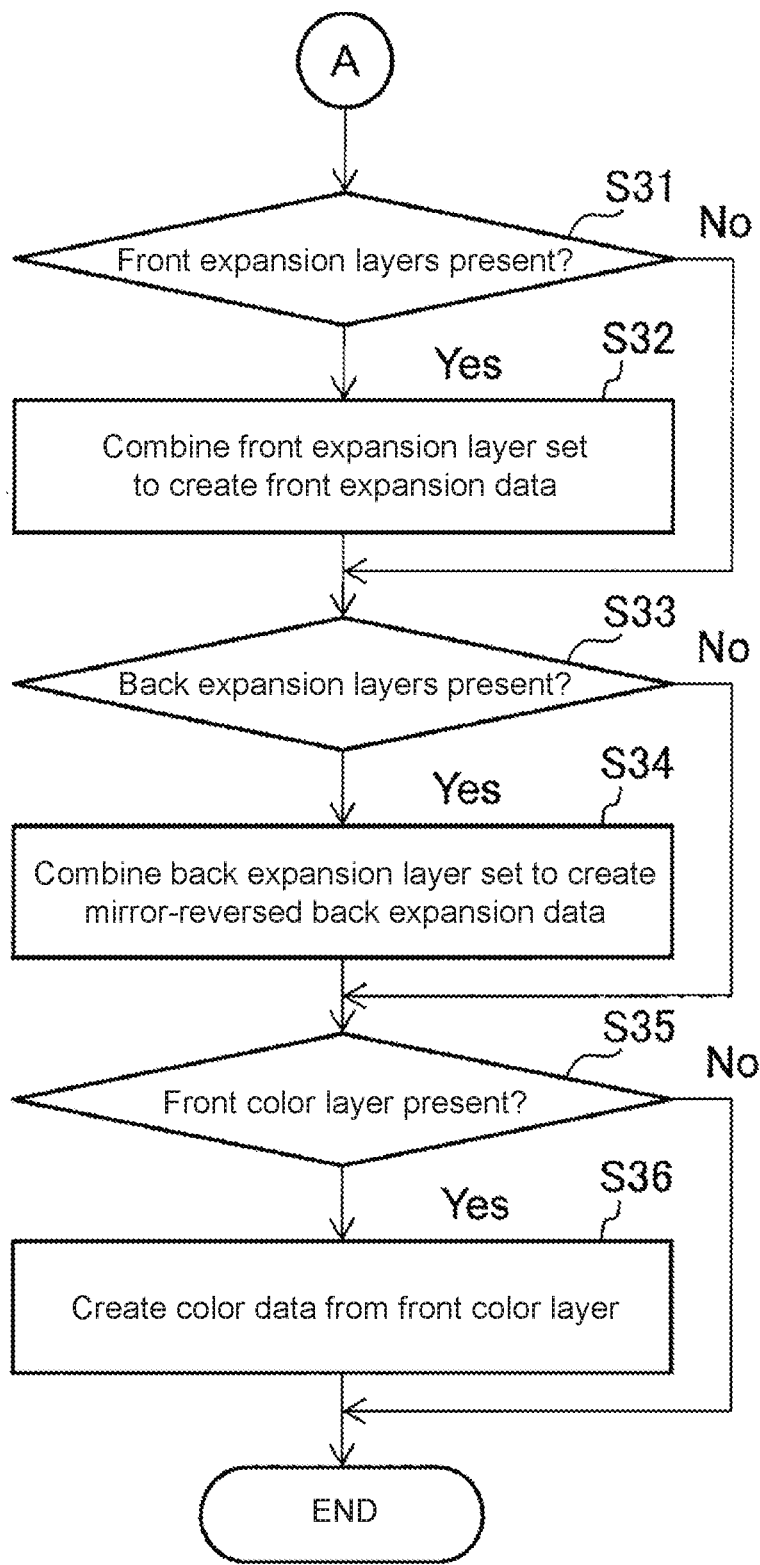
FIG. 4 is a flowchart illustrating a print data creation process for the surfacer (second example).

FIGS. 3 and 4 are flowcharts illustrating a print data creation process for when the surfacer 171 is executed. Here, these processes will be described with reference to FIGS. 1 and 2 as appropriate.

Figure 5A:
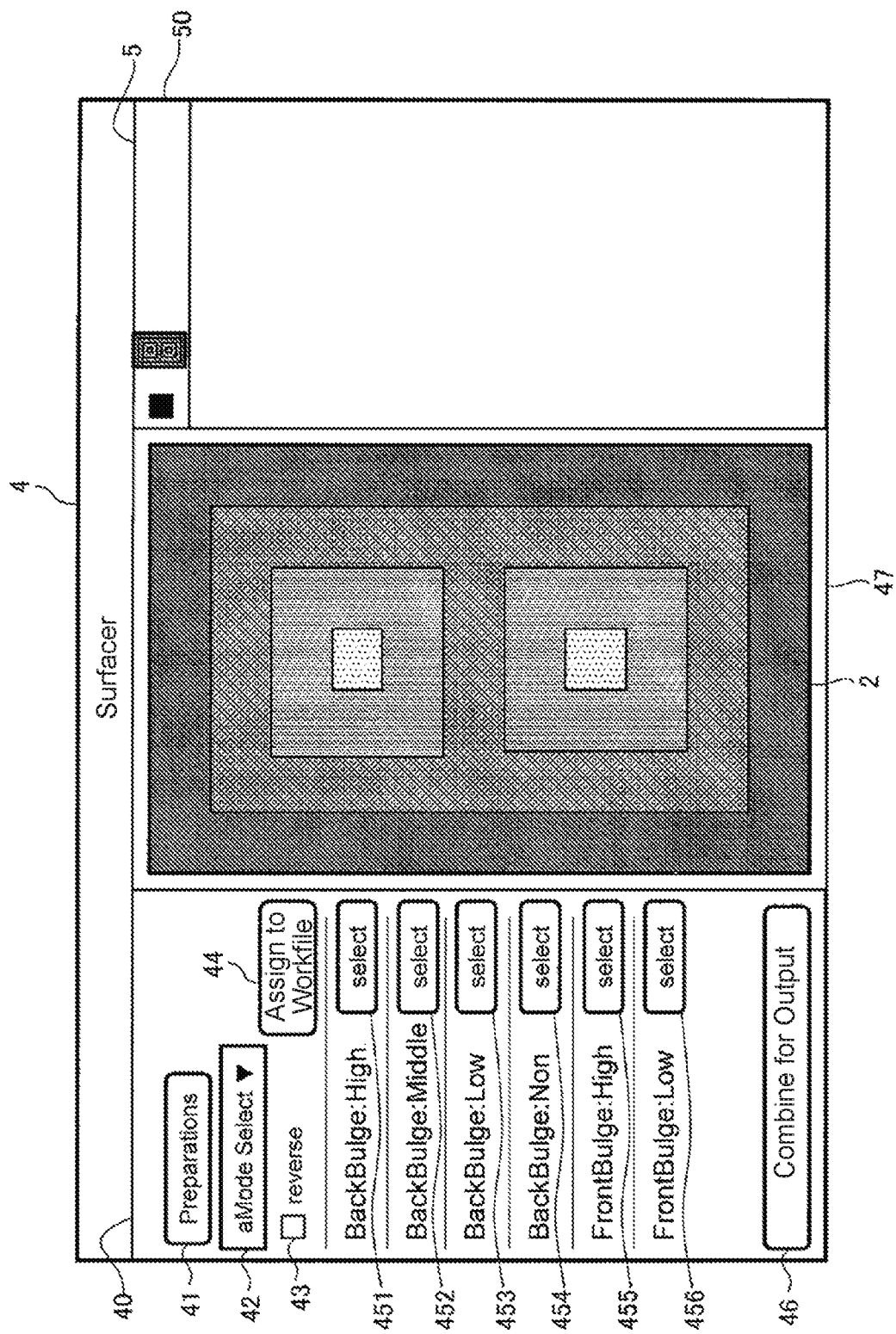
FIG. 5A is an example of a surfacer screen on which image data is displayed.

First, the user opens a file selection dialog or the like on the user terminal 1 (see FIG. 1) and specifies an image file (step S20). The CPU 11 reads the specified image file (step S21), extracts the image file in the RAM 13, and then displays the image file on the display unit 14. FIG. 5A (described later) illustrates the screen displayed on the display unit 14 at this time.

Figure 5B:
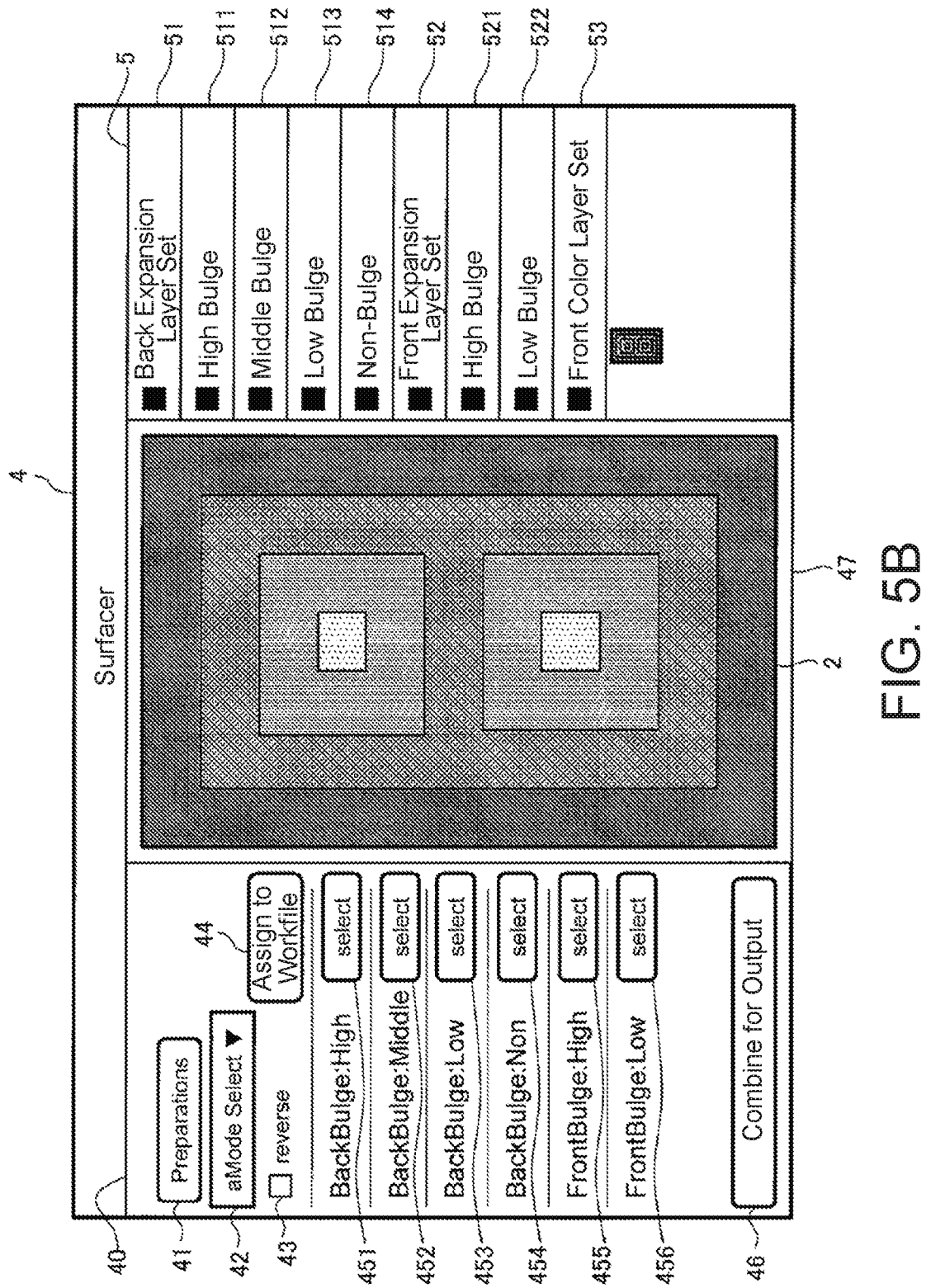
FIG. 5B is an example of the surfacer screen on which layers are displayed in a layer pane.

When the user specifies a layer division method on the user terminal 1 (step S22), the CPU 11 creates working layers (step S23) and displays those layers on the display unit 14. FIG. 5B (described later) illustrates the screen displayed on the display unit 14 at this time.

Figure 5C:
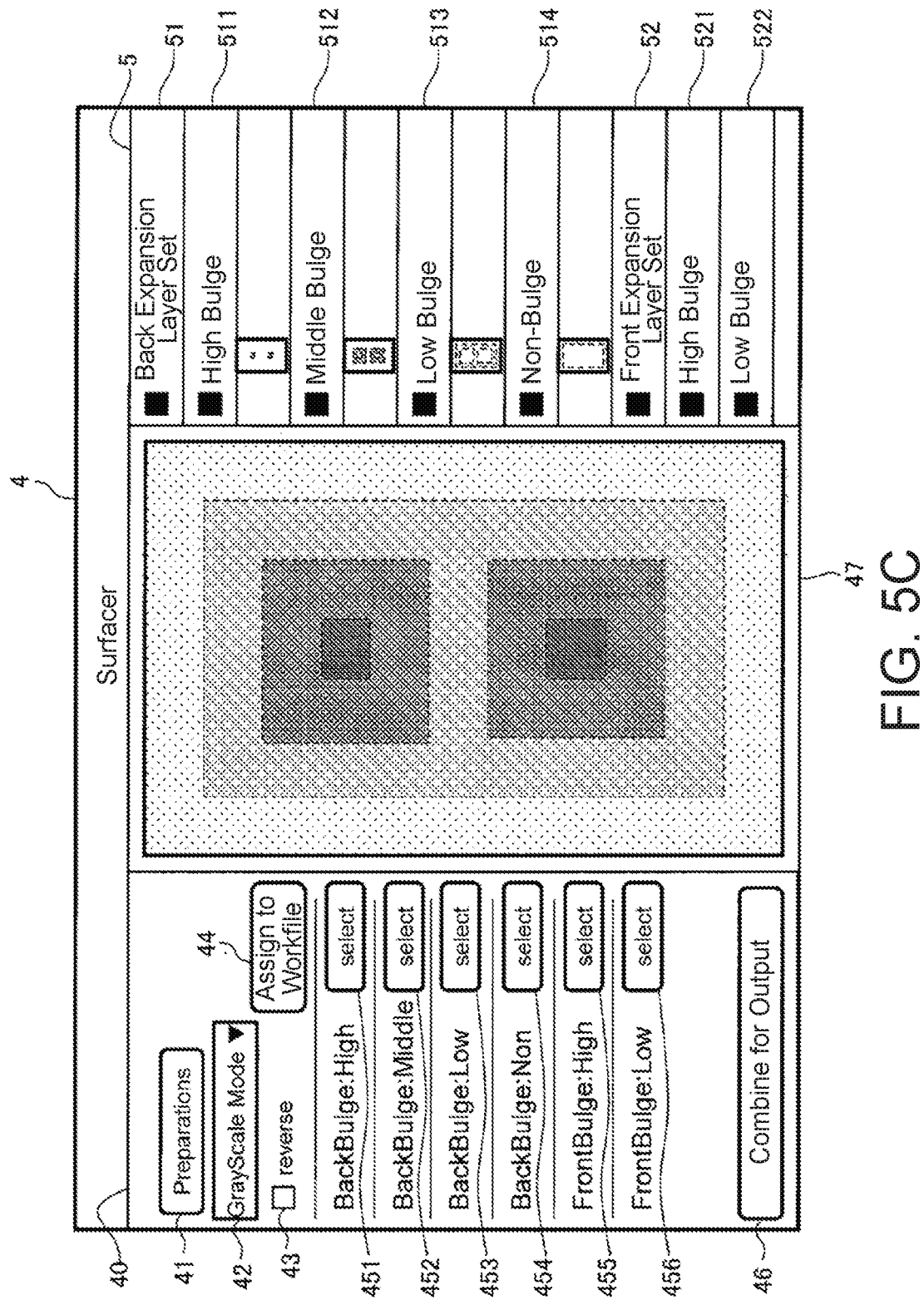
FIG. 5C is an example of the surfacer screen on which regions of the image data are allocated to expansion data in accordance with specified division parameters.

Then, when the user specifies to create a working file on the user terminal 1 (step S24), the CPU 11 allocates the image to the layers (step S25) and displays those layers on the display unit 14. FIG. 5C (described later) illustrates the screen displayed on the display unit 14 at this time.

After step S25, the CPU 11 waits for a user input operation (step S26). If a layer selection input operation is received, the CPU 11 proceeds to step S27 and displays the selected layer on the display unit 14 and then returns to step S26 and waits for further user input operations. Here, "layer selection input operation" refers to checking checkboxes corresponding to the layers.

If a layer deselection input operation is received, the CPU 11 proceeds to step S28 and hides the deselected layer on the display unit 14 and then returns to step S26 and waits for further user input operations. Here, "layer deselection input operation" refers to unchecking checkboxes corresponding to the layers.

Figure 5D:
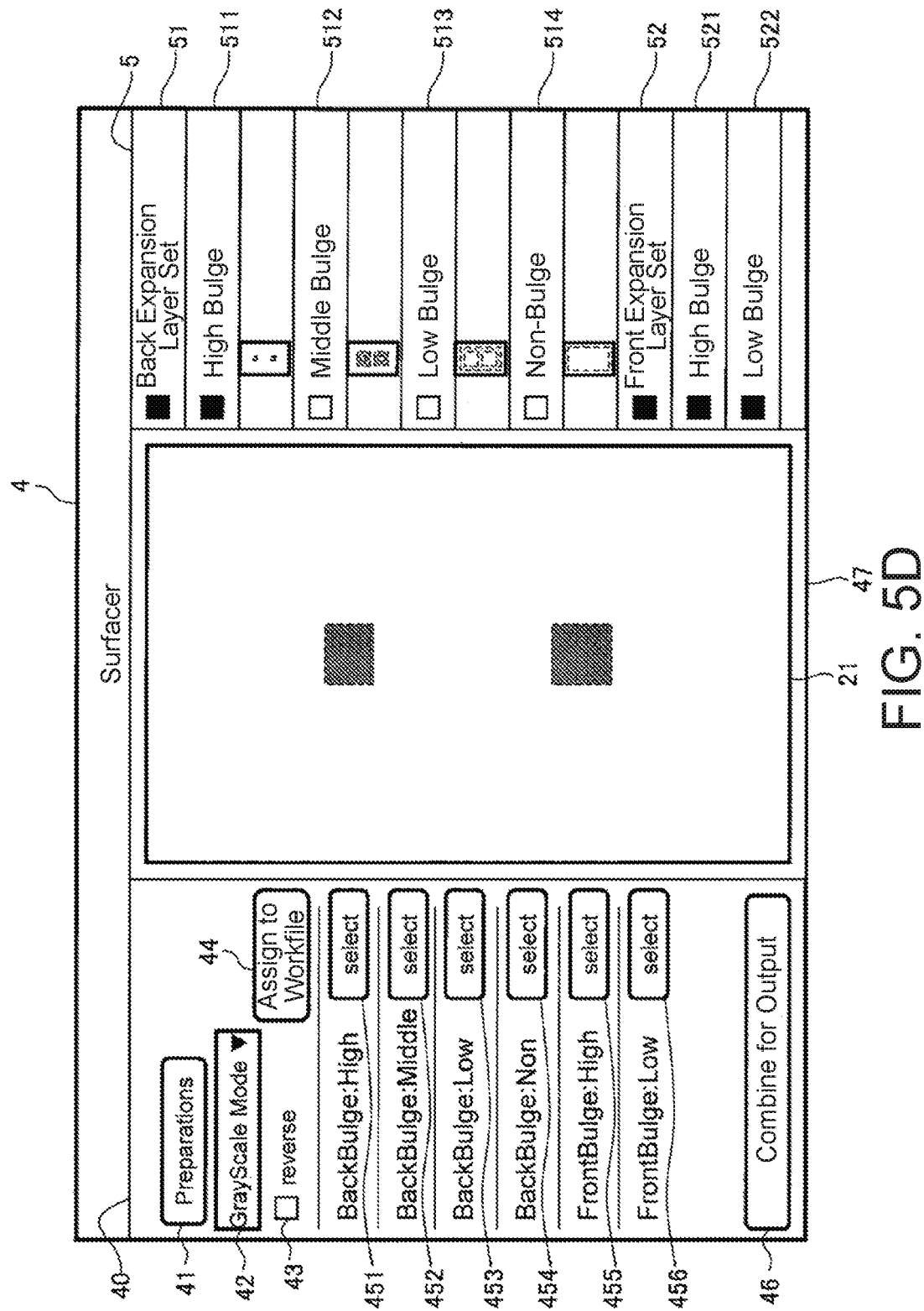
FIG. 5D is an example of the surfacer screen on which a high bulge layer of a back expansion layer set is displayed.
Figure 5E:
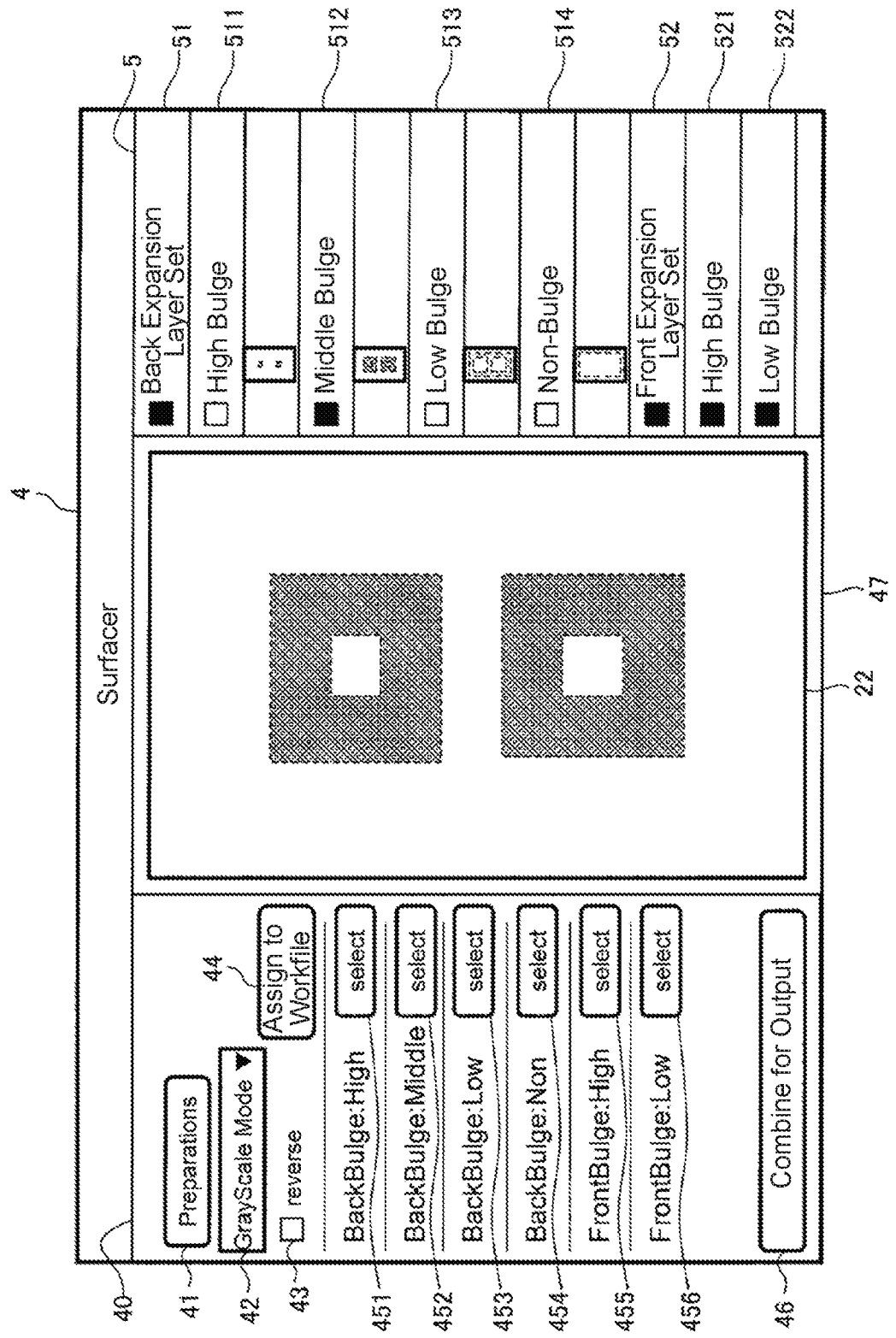
FIG. 5E is an example of the surfacer screen on which a middle bulge layer of the back expansion layer set is displayed.
Figure 5F:
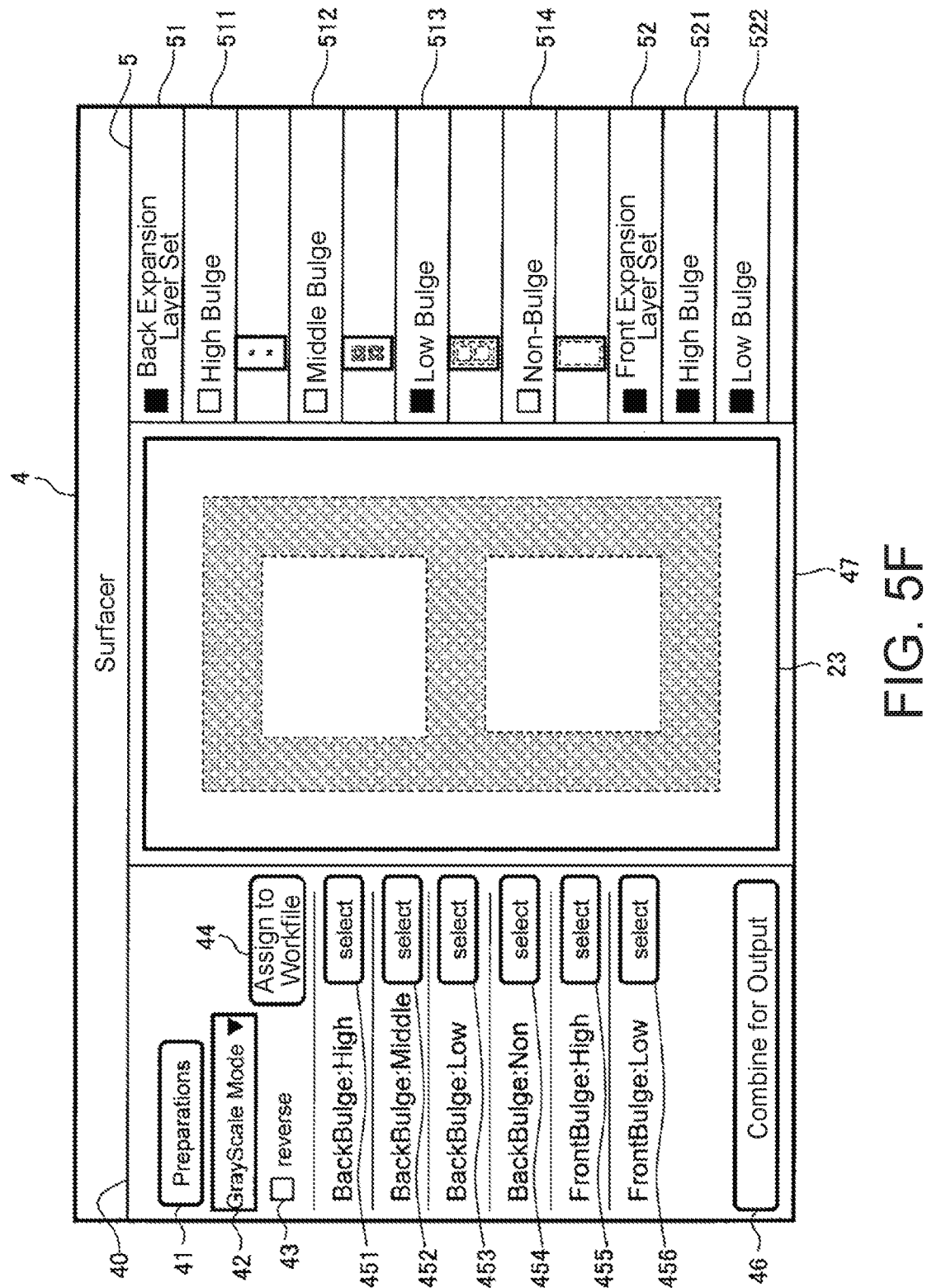
FIG. 5F is an example of the surfacer screen on which a low bulge layer of the back expansion layer set is displayed.
Figure 5G:
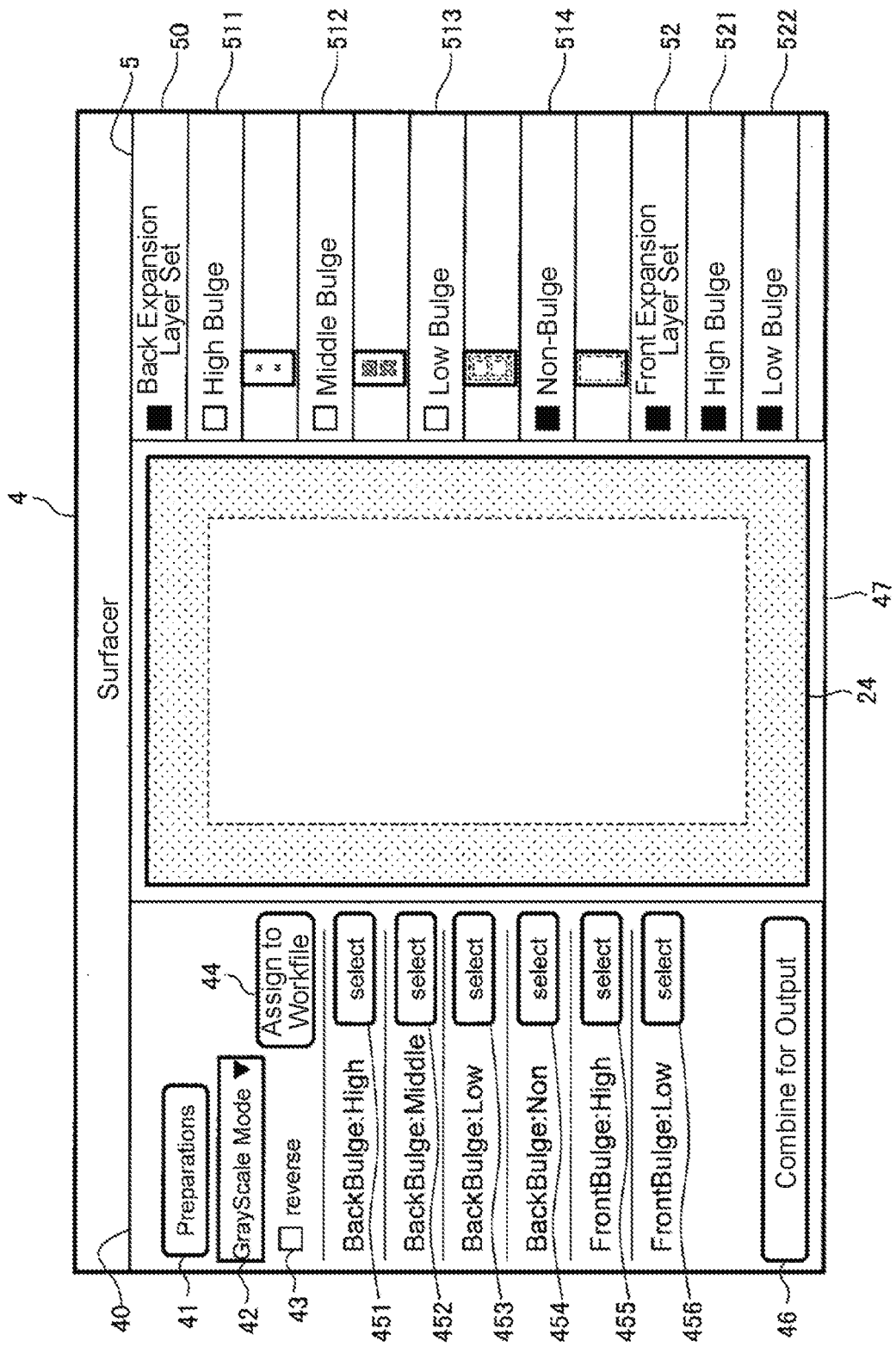
FIG. 5G is an example of the surfacer screen on which a non-bulge layer of the back expansion layer set is displayed.
Figure 5H:
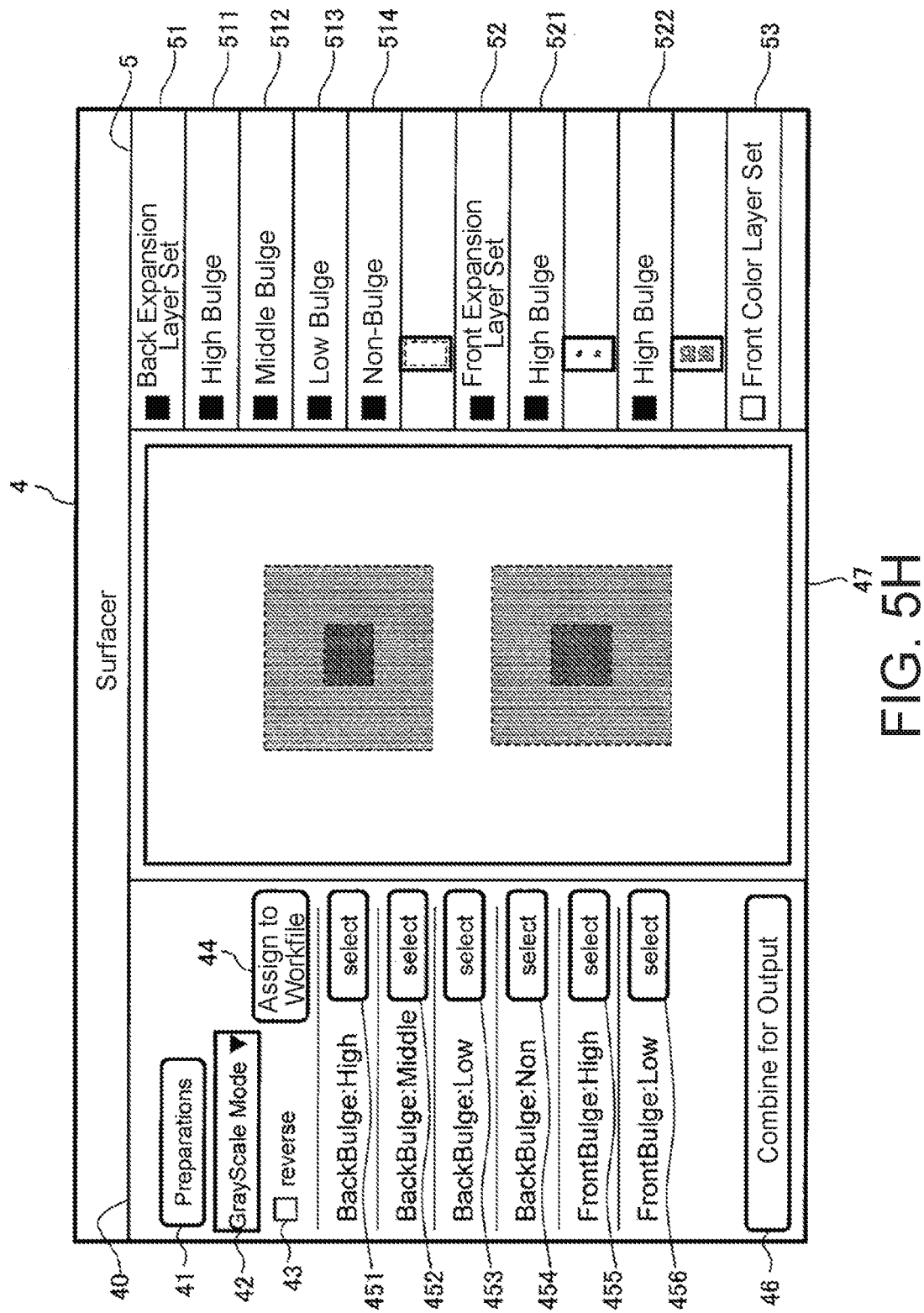
FIG. 5H is an example of the surfacer screen on which a front expansion layer set is displayed.
Figure 51:
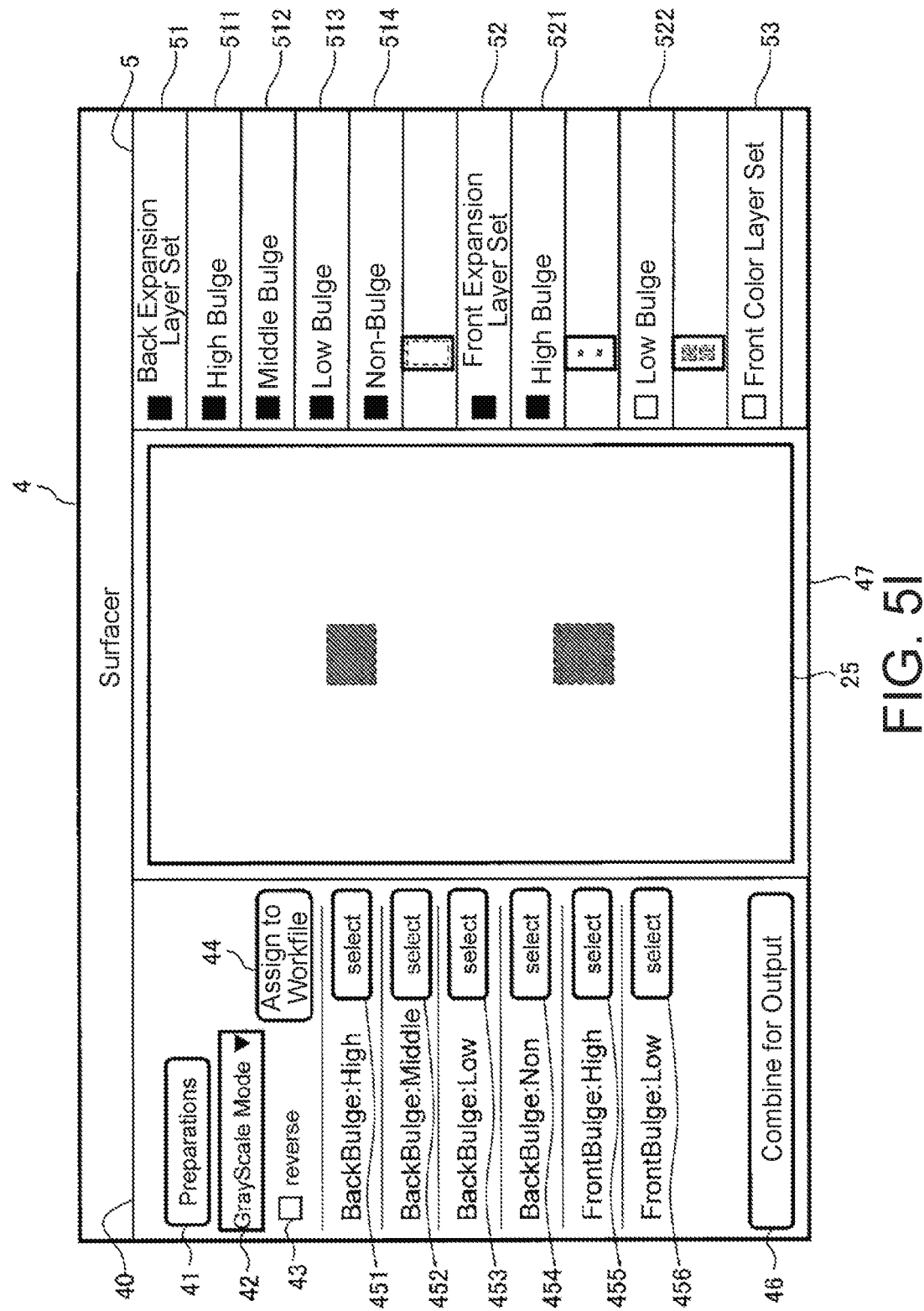
Figure 5J:
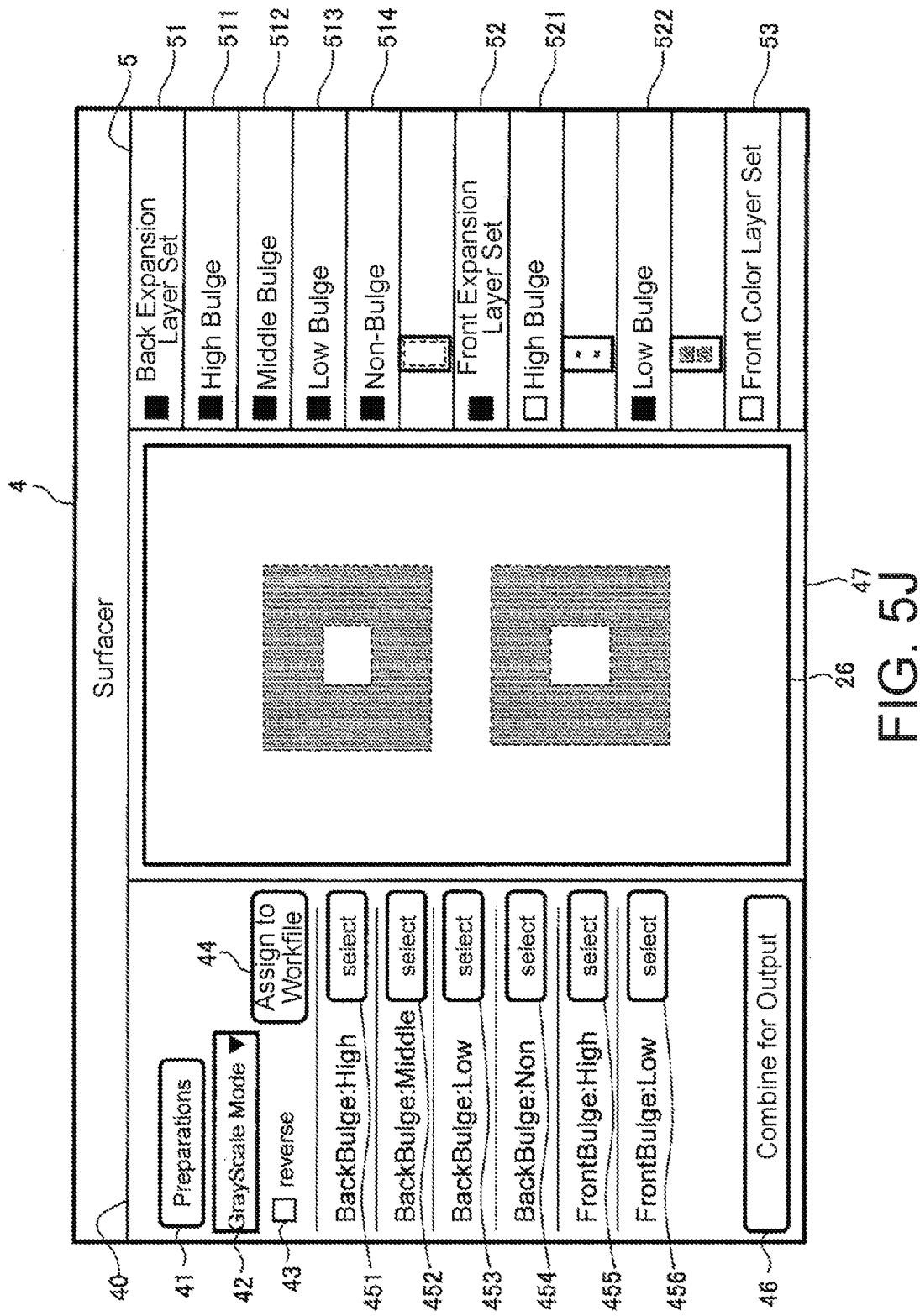
FIG. 5J is an example of the surfacer screen on which a low bulge layer of the front expansion layer set is displayed.

FIGS. 5D to 5J (described later) illustrate the screens displayed on the display unit 14 after steps S26 and S27 are executed. Moreover, the screens illustrated in FIGS. 5H to 5J are the screens displayed when steps S26 and S27 are executed after executing step S29 (described later).

If a selected layer destination is specified in step S26, the CPU 11 proceeds to step S29. Here, "selected layer" refers to a layer for which the corresponding checkbox was checked. The CPU 11 moves the selected layer region (a non-transparent region of a prescribed density) to a destination layer specified using Select buttons 451 to 456 illustrated in FIGS. 5A to 5J (step S29), and then returns to step S26 and waits for further user input operations. In this way, the user can move back expansion layers to the front expansion layers. FIGS. 5I and 5J (described later) illustrate screens displayed on the display unit 14 at this time.

The CPU 11 moves the selected region in the layer selected by the user to a destination layer specified using the Select buttons 451 to 456 (step S30), and then returns to step S26 and waits for further user input operations.

If an output command is received in step S26, the CPU 11 proceeds to step S31 in FIG. 4. Here, "output command" refers to the user clicking a Combine for Output button 46 illustrated in FIGS. 5A to 5J.

If there are any front expansion layers (Yes in step S31), the CPU 11 combines the front expansion layer set to create the front expansion data 32 (step S32). If there are no front expansion layers (No in step S31), the CPU 11 proceeds to step S33.

In step S33, if there are any back expansion layers (Yes in step S33), the CPU 11 combines the back expansion layer set to create the mirror-reversed back expansion data 31 (step S34). If there are no back expansion layers (No in step S33), the CPU 11 proceeds to step S35.

In step S35, if the front color layer 27 is present (Yes in step S35), the CPU 11 creates the color data 33 from the front color layer 27 (step S36). If the front color layer 27 is not present (No in step S35), the CPU 11 ends the process illustrated in FIG. 4. In this way, the CPU 11 outputs data managed for each layer in the user terminal 1 as a content file, thereby making it possible to cause a later stage optimizer 172 (described later) to read the content file and optimize the content for the thermally distensible sheet.

FIG. 5A is an example of a surfacer screen 4 on which the image data 2 is displayed.

On the surfacer screen 4, an operations pane 40 is displayed on the left side, an image pane 47 is displayed in the center, and a layer pane 5 is displayed on the right side.

The operations pane 40 displays a Preparations button 41, an aMode Select menu 42, a Reverse checkbox 43, an Allocate to Workfile button 44, the Select buttons 451 to 456, and the Combine for Output button 46.

The Preparations button 41 prepares a storage location for the layers. Here, "layers" includes layers of expansion data divided by region and a layer that contains color information for the overall regions. The layers of expansion data divided by region correspond to the high bulge layer 21, the middle bulge layer 22, the low bulge layer 23, the non-bulge layer 24, the high bulge layer 25, and the low bulge layer 26 described above and illustrated in FIG. 2. The layer that contains color information for the overall regions corresponds to the front color layer 27.

The aMode Select menu 42 is a menu for selecting parameters for allocating the regions in the image data 2 into expansion data and allows a brightness-based division method to be selected. The Reverse checkbox 43 reverses the parameters for allocating the regions in the image data to expansion data.

The Allocate to Workfile button 44 allocates the regions in the image data 2 to expansion data in accordance with the specified division parameters. When the Allocate to Workfile button 44 is clicked while the brightness-based division method is selected, regions with low brightness that are approximately black are allocated to the non-bulge layer 24. Regions with high brightness that are approximately white are allocated to the high bulge layer 21. Regions with brightness levels between the two mentioned above are allocated to the middle bulge layer 22 or the low bulge layer 23 in accordance with the respective brightnesses.

When the Allocate to Workfile button 44 is clicked while the brightness-based division method is selected and the Reverse checkbox 43 is checked, regions with low brightness that are approximately black are allocated to the high bulge layer 21. Regions with high brightness that are approximately white are allocated to the non-bulge layer 24. Regions with brightness levels between the two mentioned above are allocated to the low bulge layer 23 or the middle bulge layer 22 in accordance with the respective brightnesses.

The Select buttons 451 to 456 move a selected layer or a selected region in a selected layer to the layers corresponding to the Select buttons 451 to 456 and change the density of the moved layer or region to that of the destination layer.

When a layer or a region within a layer is selected and then the Select button 451 is clicked, the CPU 11 moves the selected layer or region to the high bulge layer 21 and changes the density to 100%. When the Select button 452 is clicked, the CPU 11 moves the selected layer or region to the middle bulge layer 22 and changes the density to 66%. When the Select button 453 is clicked, the CPU 11 moves the selected layer or region to the low bulge layer 23 and changes the density to 33%. When the Select button 454 is clicked, the CPU 11 moves the selected layer or region to the non-bulge layer 24 and changes the density to 0%. When the Select button 455 is clicked, the CPU 11 moves the selected layer or region to the high bulge layer 25 and changes the density to 50%. When the Select button 456 is clicked, the CPU 11 moves the selected layer or region to the low bulge layer 26 and changes the density to 25%.

The Combine for Output button 46 issues a data output command. When the Combine for Output button 46 is clicked, the CPU 11 combines and mirror-reverses the layers in the back expansion layer set and outputs the resulting data as the back expansion data 31. The CPU 11 also combines the layers in the front expansion layer set, outputs the resulting data as the front expansion data 32, and outputs the front color layer 27 as the color data 33.

The image pane 47 displays the image data 2. The layer pane 5 is arranged on the right side of the image pane 47 and displays a layer checkbox 50 corresponding to the image data 2. In the drawings for the present embodiment, black checkboxes represent the selected state and white checkboxes represent the unselected state. The layer checkbox 50 displays a thumbnail of the image data 2.

In the surfacer screen 4 illustrated in FIG. 5A, when the Preparations button 41 is clicked, a storage location for the layers is prepared, and the display state transitions to the surfacer screen 4 illustrated in FIG. 5B.

FIG. 5B is an example of the surfacer screen 4 in which layers are displayed in the layer pane 5.

In the surfacer screen 4 illustrated in FIG. 5B, the image pane 47 displays the front color layer 27. The layer pane 5 arranged on the right side of the image pane 47 displays a back expansion layer set checkbox 51, a front expansion layer set checkbox 52, and a front color layer set checkbox 53. The back expansion layer set checkbox 51 is used to display back expansion layers on the image pane 47. The front expansion layer set checkbox 52 is used to display front expansion layers on the image pane 47. The front color layer set checkbox 53 is used to display the front color layer 27 on the image pane 47. In FIG. 5B, all of the checkboxes included in the layer pane 5 are checked. Below the front color layer set checkbox 53, a thumbnail of the front color layer 27 is displayed.

Below the back expansion layer set checkbox 51, a high bulge checkbox 511, a middle bulge checkbox 512, a low bulge checkbox 513, and a non-bulge checkbox 514 are displayed. The high bulge checkbox 511 is used to display the high bulge layer 21 on the image pane 47. The middle bulge checkbox 512 is used to display the middle bulge layer 22 on the image pane 47. The low bulge checkbox 513 is used to display the low bulge layer 23 on the image pane 47. The non-bulge checkbox 514 is used to display the non-bulge layer 24 on the image pane 47. In FIG. 5B, the high bulge checkbox 511, the middle bulge checkbox 512, the low bulge checkbox 513, and the non-bulge checkbox 514 are all checked.

Below the front expansion layer set checkbox 52, a high bulge checkbox 521 and a low bulge checkbox 522 are displayed. The high bulge checkbox 521 is used to display the high bulge layer 25 on the image pane 47. The low bulge checkbox 522 is used to display the low bulge layer 26 on the image pane 47. In FIG. 5B, the high bulge checkbox 521 and the low bulge checkbox 522 are both checked.

In the surfacer screen 4 illustrated in FIG. 5B, when the user clicks the Allocate to Workfile button 44, the display state transitions to the surfacer screen 4 illustrated in FIG. 5C.

FIG. 5C is an example of the surfacer screen 4 in which the regions of the image data 2 are allocated to expansion data in accordance with the specified division parameters.

Thus, when the user clicks the Allocate to Workfile button 44, the CPU 11 runs the surfacer 171 to allocate layers to the back expansion data. Regions of the image data 2 with a brightness of greater than 75% are moved to the high bulge layer 21. As these regions are moved, the density for the high bulge layer 21 is changed to a prescribed value (such as 100%). Regions of the image data 2 with a brightness of greater than 50% and less than or equal to 75% are moved to the middle bulge layer 22. As these regions are moved, the density for the middle bulge layer 22 is changed to a prescribed value (such as 66%). Regions of the image data 2 with a brightness of greater than 25% and less than or equal to 50% are moved to the low bulge layer 23. As these regions are moved, the density for the low bulge layer 23 is changed to a prescribed value (such as 33%). Regions of the image data 2 with a brightness of less than or equal to 25% are moved to the non-bulge layer 24. As these regions are moved, the density for the non-bulge layer 24 is changed to a prescribed value (such as 0%).

Next, the checkboxes displayed for all of the layers are selected. Moreover, an image in which all of the layers are overlapped is displayed on the image pane 47. Then, if the user wants to view the image for one of the layers individually (such as the high bulge layer 21), the user can uncheck the checkboxes for the layers other than the target layer.

In the surfacer screen 4 illustrated in FIG. 5C, the image pane 47 displays all of the layers included in the back expansion layer set in a combined manner. The layer pane 5 arranged on the right side of the image pane 47 displays the back expansion layer set checkbox 51 and the front expansion layer set checkbox 52. Moreover, although here the front color layer set checkbox 53 is hidden below the bottom of the screen, the user can scroll the layer pane 5 to show the front color layer set checkbox 53.

In FIG. 5C, the back expansion layer set checkbox 51, the high bulge checkbox 511, the middle bulge checkbox 512, the low bulge checkbox 513, and the non-bulge checkbox 514 are all checked, which indicates that all of the layers included in the back expansion layer set are displayed in the image pane 47.

Below the high bulge checkbox 511, a thumbnail of the high bulge layer 21 is displayed. Below the middle bulge checkbox 512, a thumbnail of the middle bulge layer 22 is displayed. Below the low bulge checkbox 513, a thumbnail of the low bulge layer 23 is displayed. Below the non-bulge checkbox 514, a thumbnail of the non-bulge layer 24 is displayed.

Moreover, the high bulge checkbox 521 and the low bulge checkbox 522 are displayed below the front expansion layer set checkbox 52. The front expansion layer set checkbox 52, the high bulge checkbox 521, and the low bulge checkbox 522 are all checked. However, there is currently no front expansion data 32, high bulge layer 25, or low bulge layer 26, and therefore nothing is displayed for these items.

On the surfacer screens 4 illustrated in FIGS. 5C to 5G, when the user clicks the Combine for Output button 46, the CPU 11 outputs the content 3. In other words, the CPU 11 outputs the back expansion data 31 in which the high bulge layer 21, the middle bulge layer 22, and the low bulge layer 23 are combined and mirror-reversed and also outputs the front color layer 27 as the color data 33.

In the surfacer screen 4 illustrated in FIG. 5C, if the user unchecks the middle bulge checkbox 512, the low bulge checkbox 513, and the non-bulge checkbox 514, the display state transitions to the surfacer screen 4 illustrated in FIG. 5D.

FIG. 5D is an example of the surfacer screen 4 on which the high bulge layer 21 of the back expansion layer set is displayed.

On the surfacer screen 4 illustrated in FIG. 5D, the image pane 47 displays the high bulge layer 21 included in the back expansion layer set. In the layer pane 5 arranged on the right side of the image pane 47, only the back expansion layer set checkbox 51 and the high bulge checkbox 511 are checked, which indicates that the high bulge layer 21 is displayed on the image pane 47. The middle bulge checkbox 512, the low bulge checkbox 513, and the non-bulge checkbox 514 are unchecked. This high bulge layer 21 includes a region of a prescribed density (such as 100%) indicated by hatching and a transparent region displayed in white.

In the surfacer screen 4 illustrated in FIG. 5D, if the user checks the middle bulge checkbox 512 and unchecks the high bulge checkbox 511, the display state transitions to the surfacer screen 4 illustrated in FIG. 5E.

FIG. 5E is an example of the surfacer screen 4 in which the middle bulge layer 22 of the back expansion layer set is displayed.

In the surfacer screen 4 illustrated in FIG. 5E, the image pane 47 displays the middle bulge layer 22 included in the back expansion layer set. In the layer pane 5 arranged on the right side of the image pane 47, the back expansion layer set checkbox 51 and the middle bulge checkbox 512 are checked, which indicates that the middle bulge layer 22 is displayed in the image pane 47. The high bulge checkbox 511, the low bulge checkbox 513, and the non-bulge checkbox 514 are unchecked. This middle bulge layer 22 includes a region of a prescribed density (such as 66%) indicated by hatching and a transparent region displayed in white.

The front expansion layer set checkbox 52, the high bulge checkbox 521, and the low bulge checkbox 522 checked. However, there is currently no front expansion data 32, high bulge layer 25, or low bulge layer 26, and therefore nothing is displayed for these items.

In the surfacer screen 4 illustrated in FIG. 5E, if the user checks the low bulge checkbox 513 and unchecks the middle bulge checkbox 512, the display state transitions to the surfacer screen 4 illustrated in FIG. 5F. Moreover, if the user checks the back expansion layer set checkbox 51, this also checks the high bulge checkbox 511, the middle bulge checkbox 512, the low bulge checkbox 513, and the non-bulge checkbox 514, and the display state transitions to the surfacer screen 4 illustrated in FIG. 5C. This makes it possible to easily preview the image that will be printed for the back expansions.

FIG. 5F is an example of the surfacer screen 4 in which the low bulge layer 23 of the back expansion layer set is displayed.

In the surfacer screen 4 illustrated in FIG. 5F, the image pane 47 displays the low bulge layer 23 included in the back expansion layer set. In the layer pane 5 arranged on the right side of the image pane 47, the back expansion layer set checkbox 51 and the low bulge checkbox 513 are checked, which indicates that the low bulge layer 23 is displayed in the image pane 47. The high bulge checkbox 511, the middle bulge checkbox 512, and the non-bulge checkbox 514 are unchecked. This low bulge layer 23 includes a region of a prescribed density (such as 33%) indicated by hatching and a transparent region displayed in white.

The front expansion layer set checkbox 52, the high bulge checkbox 521, and the low bulge checkbox 522 are checked. However, there is currently no front expansion data 32, high bulge layer 25, or low bulge layer 26, and therefore nothing is displayed for these items.

In the surfacer screen 4 illustrated in FIG. 5F, if the user checks the non-bulge checkbox 514 and unchecks the low bulge checkbox 513, the display state transitions to the surfacer screen 4 illustrated in FIG. 5G.

FIG. 5G is an example of the surfacer screen 4 in which the non-bulge layer 24 of the back expansion layer set is displayed.

In the surfacer screen 4 illustrated in FIG. 5G, the image pane 47 displays the non-bulge layer 24 included in the back expansion layer set. In the layer pane 5 arranged on the right side of the image pane 47, the back expansion layer set checkbox 51 and the non-bulge checkbox 514 are checked, which indicates that the non-bulge layer 24 is displayed in the image pane 47. The high bulge checkbox 511, the middle bulge checkbox 512, and the low bulge checkbox 513 are unchecked. This non-bulge layer 24 includes a region of a prescribed density (such as 0%) indicated by hatching and a transparent region displayed in white. The front expansion layer set checkbox 52, the high bulge checkbox 521, and the low bulge checkbox 522 are checked. However, there is no front expansion data 32, high bulge layer 25, or low bulge layer 26, and therefore nothing is displayed for these items.

FIGS. 5H to 5J (described below) illustrate states in which two layers in the back expansion layer set have been moved to the front expansion layer set and the low bulge layer 23 in the back expansion layer set has been moved to the non-bulge layer 24.

When the user selects the thumbnail below the high bulge checkbox 511 and then clicks the Select button 455, the high bulge layer 21 included in the back expansion layer set is moved to the high bulge layer 25 included in the front expansion layer set. As this layer is moved, the density for the high bulge layer 21 is changed to a prescribed value for the high bulge layer 25 of the front expansion layer set (such as 50%).

When the user selects the thumbnail below the middle bulge checkbox 512 and then clicks the Select button 456, the middle bulge layer 22 included in the back expansion layer set is moved to the low bulge layer 26 included in the front expansion layer set. As this layer is moved, the density for the middle bulge layer 22 is changed to a prescribed value for the low bulge layer 26 of the front expansion layer set (such as 25%).

When the user selects the thumbnail below the low bulge checkbox 513 and then clicks the Select button 454, the low bulge layer 23 included in the back expansion layer set is moved to the non-bulge layer 24. As this layer is moved, the density for the low bulge layer 23 is changed to the prescribed value for the non-bulge layer 24 (such as 0%).

FIG. 5H is an example of the surfacer screen 4 in which the front expansion layer set is displayed.

In the surfacer screen 4 illustrated in FIG. 5H, the image pane 47 displays all of the layers included in the front expansion layer set in a combined manner.

In FIG. 5H, the front expansion layer set checkbox 52 is checked.

Moreover, the high bulge checkbox 521 and the low bulge checkbox 522 are displayed below the front expansion layer set checkbox 52. In FIG. 5H, the high bulge checkbox 521 and the low bulge checkbox 522 are checked, which indicates that these layers are displayed in a combined manner in the image pane 47. Below the high bulge checkbox 521, a thumbnail of the high bulge layer 25 is displayed. Below the low bulge checkbox 522, a thumbnail of the low bulge layer 26 is displayed.

In the surfacer screens 4 illustrated in FIGS. 5H to 5J, when the user clicks the Combine for Output button 46, the CPU 11 outputs the content 3. In other words, the CPU 11 outputs the front expansion data 32 in which the high bulge layer 25 and the low bulge layer 26 are combined and also outputs the front color layer 27 as the color data 33.

In the surfacer screen 4 illustrated in FIG. 5H, if the user unchecks the low bulge checkbox 522, the display state transitions to the surfacer screen 4 illustrated in FIG. 5I.

FIG. 5I is an example of the surfacer screen on which the high bulge layer of the front expansion layer set is displayed.

In the surfacer screen 4 illustrated in FIG. 5I, the image pane 47 displays the high bulge layer 25 included in the front expansion layer set. In the layer pane 5 arranged on the right side of the image pane 47, the front expansion layer set checkbox 52 and the high bulge checkbox 521 are checked, which indicates that the high bulge layer 25 is displayed in the image pane 47. The low bulge checkbox 522 is unchecked. This high bulge layer 25 includes a region of a prescribed density (such as 50%) indicated by hatching and a transparent region displayed in white.

The back expansion layer set checkbox 51, the high bulge checkbox 511, the middle bulge checkbox 512, the low bulge checkbox 513, and the non-bulge checkbox 514 are also checked. However, there is currently no back expansion data 31, high bulge layer 21, middle bulge layer 22, low bulge layer 23, or non-bulge layer 24, and therefore nothing is displayed for these items.

In the surfacer screen 4 illustrated in FIG. 5I, if the user checks the low bulge checkbox 522 and unchecks the high bulge checkbox 521, the display state transitions to the surfacer screen 4 illustrated in FIG. 5J. Moreover, if the user checks the front expansion layer set checkbox 52, this also checks the high bulge checkbox 521 and the low bulge checkbox 522, and the display state transitions to the surfacer screen 4 illustrated in FIG. 5H. This makes it possible to easily preview the image that will be printed for the front expansions.

FIG. 5J is an example of the surfacer screen 4 in which the low bulge layer of the front expansion layer set is displayed.

In the surfacer screen 4 illustrated in FIG. 5J, the image pane 47 displays the low bulge layer 26 included in the front expansion layer set. In the layer pane 5 arranged on the right side of the image pane 47, the front expansion layer set checkbox 52 and the low bulge checkbox 522 are checked, which indicates that the low bulge layer 26 is displayed in the image pane 47. The high bulge checkbox 521 is unchecked. This low bulge layer 26 includes a region of a prescribed density (such as 25%) indicated by hatching and a transparent region displayed in white.

Here, the back expansion layer set checkbox 51, the high bulge checkbox 511, the middle bulge checkbox 512, the low bulge checkbox 513, and the non-bulge checkbox 514 are also checked. However, there is currently no back expansion data 31, high bulge layer 21, middle bulge layer 22, low bulge layer 23, or non-bulge layer 24, and therefore nothing is displayed for these items.

Figure 6:
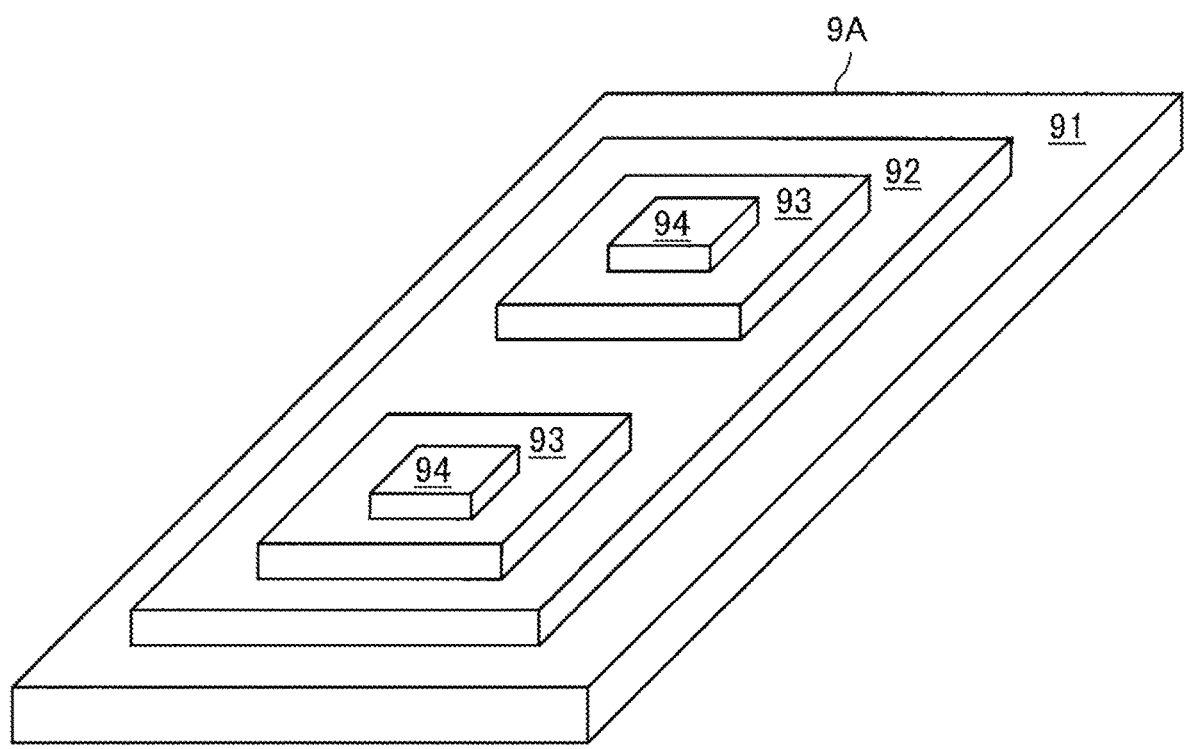
FIG. 6 is a perspective view illustrating an example of a three-dimensional image.

FIG. 6 is a perspective view illustrating an example of a three-dimensional image.

This three-dimensional image 9A is formed on the basis of the content 3 output from the surfacer screens 4 illustrated in FIGS. 5C to 5G. The three-dimensional image 9A is formed by printing the back expansion data on the rear surface of a thermally distensible sheet and then irradiating the rear surface of the thermally distensible sheet with light.

In the three-dimensional image 9A, a non-bulge region 91 corresponds to the non-bulge layer 24 illustrated in FIG. 5C. A low bulge region 92 corresponds to the low bulge layer 23 illustrated in FIG. 5C. A middle bulge region 93 corresponds to the middle bulge layer 22 illustrated in FIG. 5C. A high bulge region 94 corresponds to the high bulge layer 21 illustrated in FIG. 5C. In other words, the three-dimensional image 9A protrudes to different heights corresponding to the densities of each layer. Here, the color data 33 is not illustrated.

Figure 7:
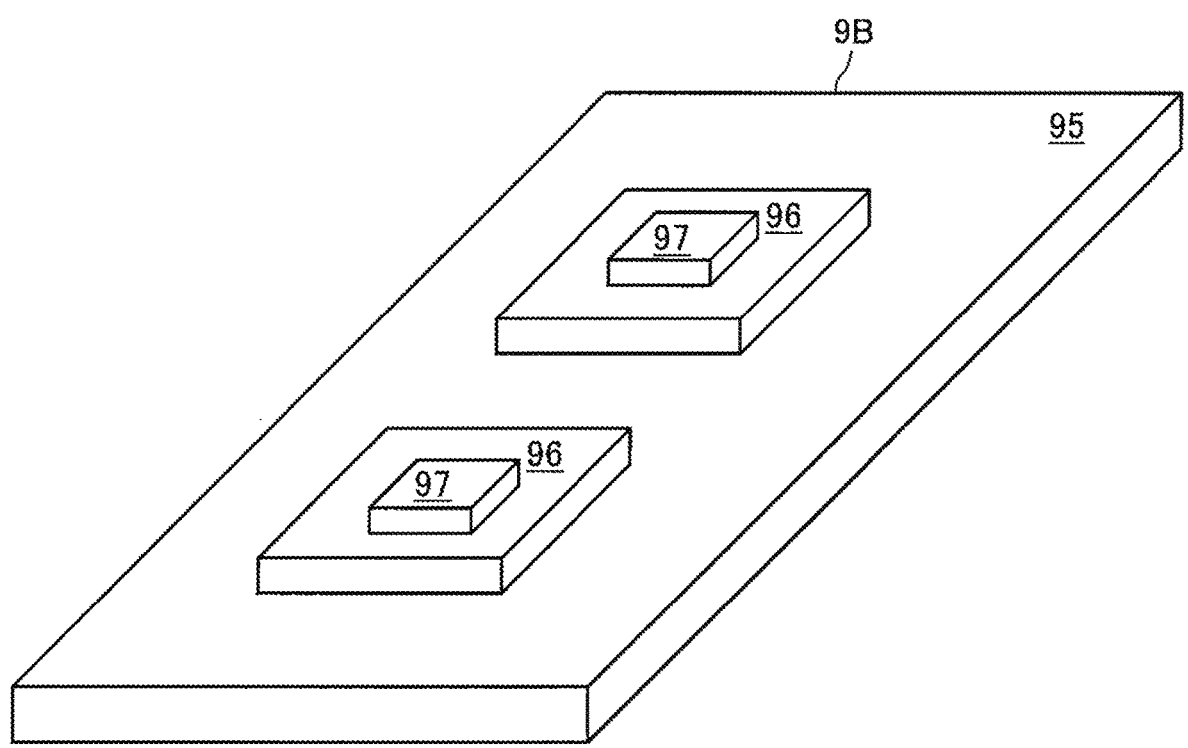
FIG. 7 is a perspective view illustrating another example of a three-dimensional image.

FIG. 7 is a perspective view illustrating another example of a three-dimensional image.

This three-dimensional image 9B is formed on the basis of the content 3 output from the surfacer screens 4 illustrated in FIGS. 5H to 5J. The three-dimensional image 9B is formed by printing the front expansion data on the front surface of the thermally distensible sheet and then irradiating the front surface of the thermally distensible sheet with light.

In the three-dimensional image 9B, a non-bulge region 95 corresponds to the non-bulge layer 24 illustrated in FIG. 5H. A low bulge region 96 corresponds to the low bulge layer 26 illustrated in FIG. 5H. A high bulge region 97 corresponds to the high bulge layer 25 illustrated in FIG. 5H. In other words, the three-dimensional image 9B protrudes to different heights corresponding to the densities of each layer. Here, the color data 33 is not illustrated.

The CPU 11 of the present embodiment functions as a layer image obtaining unit that divides image data including prescribed gradation levels into four layers on the basis of gradation values at each coordinate in order to obtain four layer images corresponding to different respective expansion heights as first expansion data for making an expansion layer included in a thermally distensible sheet expand from one surface thereof. The CPU 11 also functions as a moving unit that moves at least one region in a prescribed layer image selected from among the plurality of layer images to second expansion data for making the expansion layer expand from another surface of the thermally distensible sheet.

The CPU 11 functions as an allocating unit that allocates the image data including the prescribed gradation levels to a plurality of density layers that expand to different respective expansion heights. The CPU 11 also functions as a data creation unit that creates expansion data from the plurality of density layers. The CPU 11 functions as a changing unit that changes a prescribed region in a first density layer among the plurality of density layers to a second density layer. The data creation unit creates, from any region in expansion data to be printed on a rear surface of the thermally distensible sheet, expansion data to be printed on a front surface of the thermally distensible sheet.

MODIFICATION EXAMPLES

The present invention is not limited to the embodiment described above, and various modifications can be made without departing from the spirit of the present invention. For example, modifications such as (a) to (e) below are possible.

(a) The back expansion layers are not limited to being four layers, and the front expansion layers are not limited to being two layers. For example, the second expansion data set for the front expansion may contain a single layer image or multiple layer images that are more than two.

(b) The image data is not limited to being allocated to the back expansion layers on the basis of brightness (gradation). For example, regions may be allocated according to whether those regions include prescribed color or brightness (gradation) values.

(c) The allocation destinations for the image data are not limited to being back expansion layers, and the image data may initially be allocated to front expansion layers.

(d) The content 3 created by the surfacer 171 does not necessarily need to include all of the back expansion data 31, the front expansion data 32, and the color data 33. The content 3 may include only the back expansion data 31 and the color data 33, only the front expansion data 32 and the color data 33, or only the back expansion data 31 and the front expansion data 32, and is not limited to these examples.

(e) The content 3 created by the surfacer 171 is not limited to being surface materials and may be used for any purpose.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A three-dimensional printer that creates, from two-dimensional image data, three-dimensional print data; prints the three-dimensional print data on a thermally distensible sheet; and expands the thermally distensible sheet in accordance with the created three-dimensional print data, the printer comprising:
a processor programmed to perform the following functions:
receiving the two-dimensional image data of prescribed gradations;
dividing the image data of prescribed gradations into a number of layers less than a number of gradation levels in the image data on the basis of a gradation value at each pixel point so as to obtain a plurality of layer images of corresponding expansion heights that differ from each other as a first expansion data set, the first expansion data set being for causing an expansion layer included in a thermally distensible sheet to expand from one surface of the thermally distensible sheet;
receiving a command from a user specifying one of the plurality of layer images; and
moving and reassigning at least one region in the layer image specified by the user to a layer image belonging to a second expansion data set, the second expansion data set containing a single layer image or a plurality of layer images and being for causing the expansion layer to expand from another surface of the thermally distensible sheet that is opposite to said surface;
a printing unit that prints the first expansion data set and the second expansion data set on the thermally distensible sheet; and
an expansion device that irradiates the thermally distensible sheet having the first expansion data set and the second expansion data set printed thereon with electromagnetic waves to form protrusions and recesses on the surfaces of the thermally distensible sheet.

2. The printer according to claim 1, wherein the processor generates a plurality of density layers that expand to different respective expansion heights when printed on the thermally distensible sheet, respectively corresponding to the plurality of layer images that constitute the first expansion data set and to the single layer image or the plurality of layer images that constitute the second expansion data set.

3. The printer according to claim 2, wherein the processor is programmed to move and reassign a prescribed region in a first density layer among the plurality of density layers to a second density layer that is different from the first density layer in response to a command from the user.

4. The printer according to claim 3, wherein the first expansion data set is a data set to be printed on a rear surface of the thermally distensible sheet, and the second expansion data set is a data set to be printed on a front surface of the thermally distensible sheet.

5. The printer according to claim 4, wherein the processor is further programmed to receive another command from a user specifying a layer image from the second expansion data set; and move and reassign at least one region in the layer image specified by said another command from the user to one of the plurality of layer images constituting the first expansion data set.

6. The printer according to claim 2,
wherein each of the plurality of density layers that constitute the first expansion data set and that constitute the second expansion data set is constructed of regions having a density respectively set for that density layer, and
wherein, in response to a command from the user, the processor is programmed to move and reassign a prescribed region in a first density layer among the plurality of density layers that belongs to the first expansion data set to a second density layer and changes a density of the region to a density set for the second density layer.

7. The printer according to claim 1, wherein the first expansion data set is a data set to be printed on a rear surface of the thermally distensible sheet, and the second expansion data set is a data set to be printed on a front surface of the thermally distensible sheet.

8. The printer according to claim 7, wherein the first expansion data set has more layers than the second expansion data set.

9. A print data creation device that creates, from two-dimensional image data, three-dimensional print data to be printed on a thermally distensible sheet so as to expand the thermally distensible sheet in accordance with the created three-dimensional print data, the device comprising:
a processor programmed to perform the following functions:
receiving the two-dimensional image data of prescribed gradations;
dividing the two-dimensional image data of prescribed gradations into a plurality of density layers that expand to different respective expansion heights when printed on the thermally distensible sheet;
creating, from the plurality of density layers, an expansion data set having a plurality of layer images to be printed on the thermally distensible sheet; and
causing the expansion data set to be output to a printing unit that prints on the thermally distensible sheet,
wherein, in response to a command from a user, the processor moves a prescribed region specified in a first density layer among the plurality of density layers to a second density layer that is different from the first density layer,
wherein the first density layer corresponds to expansion data to be printed on a rear surface of the thermally distensible sheet and the second density layer corresponds to expansion data to be printed on a front surface of the thermally distensible sheet.

10. A method of creating, from two-dimensional image data, three-dimensional print data to be printed on a thermally distensible sheet, the method comprising:
receiving the two-dimensional image data of prescribed gradations;
dividing the image data of prescribed gradations into a number of layers less than a number of gradation levels in the image data on the basis of a gradation value at each pixel point so as to obtain a plurality of layer images of corresponding expansion heights that differ from each other as a first expansion data set, the first expansion data set being for causing an expansion layer included in a thermally distensible sheet to expand from one surface of the thermally distensible sheet;
receiving a command from a user specifying one of the plurality of layer images; and
moving and reassigning at least one region in the layer image specified by the user to a layer image belonging to a second expansion data set, the second expansion data set containing a single layer image or a plurality of layer images and being for causing the expansion layer to expand from another surface of the thermally distensible sheet that is opposite to said surface.

11. The method according to claim 10, further comprising generating a plurality of density layers that expand to different respective expansion heights when printed on the thermally distensible sheet, respectively corresponding to the plurality of layer images that constitute the first expansion data set and to the single layer image or the plurality of layer images that constitute the second expansion data set.

12. The method according to claim 11, further comprising, in response to a command from a user, moving a prescribed region specified by said command in a first density layer among the plurality of density layers to a second density layer that is different from the first density layer.

13. The method according to claim 12,
wherein the first expansion data set is a data set to be printed on a rear surface of the thermally distensible sheet, and the second expansion data set is a data set to be printed on a front surface of the thermally distensible sheet, and
wherein the method further comprises:
receiving another command from a user specifying a layer image from the second expansion data set; and
moving and reassigning at least one region in the layer image specified by said another command from the user to one of the plurality of layer images constituting the first expansion data set.

14. The method according to claim 11, wherein each of the plurality of density layers that constitute the first expansion data set and that constitute the second expansion data set is constructed of regions having a density respectively set for that density layer, and
wherein the method further comprises, in response to a command from the user, moving and reassigning a specified region in a first density layer among the plurality of density layers that belongs to the first expansion data set to a second density layer and changing a density of the region to a density set for the second density layer.

15. A non-transitory computer-readable storage medium having stored therein a computer-executable program for causing a print data creation device to perform the following:
receiving two-dimensional image data of prescribed gradations;
dividing the image data of prescribed gradations into a number of layers less than a number of gradations levels in the image data on the basis of a gradation value at each pixel point so as to obtain a plurality of layer images of corresponding expansion heights that differ from each other as a first expansion data set, the first expansion data set being for causing an expansion layer included in a thermally distensible sheet to expand from one surface of the thermally distensible sheet; and
receiving a command from a user specifying one of the plurality of layer images; and moving and reassigning at least one region in the layer image specified by the user to a layer image belonging to a second expansion data set, the second expansion data set containing a single layer image or a plurality of layer images and being for causing the expansion layer to expand from another surface of the thermally distensible sheet that is opposite to said surface.

* * * * *